United States Patent
Kamekawa

(10) Patent No.: US 7,849,099 B2
(45) Date of Patent: Dec. 7, 2010

(54) DOCUMENT MANAGEMENT METHOD AND APPARATUS THEREOF

(75) Inventor: Mikihiko Kamekawa, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 11/669,540

(22) Filed: Jan. 31, 2007

(65) Prior Publication Data

US 2007/0192871 A1 Aug. 16, 2007

(30) Foreign Application Priority Data

Feb. 2, 2006 (JP) ............................... 2006-026175

(51) Int. Cl.
*G06F 17/30* (2006.01)
*G06F 7/04* (2006.01)
(52) U.S. Cl. .......................................... 707/781; 726/26
(58) Field of Classification Search ................. 707/100, 707/781; 726/26
See application file for complete search history.

(56) References Cited

U.S. PATENT DOCUMENTS

| | | | |
|---|---|---|---|
| 6,757,871 B1 * | 6/2004 | Sato et al. | 715/236 |
| 2004/0177073 A1 * | 9/2004 | Snyder et al. | 707/9 |
| 2005/0055306 A1 * | 3/2005 | Miller et al. | 705/37 |
| 2005/0154908 A1 * | 7/2005 | Okamoto | 713/193 |
| 2005/0187866 A1 * | 8/2005 | Lee | 705/39 |

\* cited by examiner

*Primary Examiner*—James Trujillo
*Assistant Examiner*—Amresh Singh
(74) *Attorney, Agent, or Firm*—Cowan, Liebowitz & Latman, P.C.

(57) ABSTRACT

A check-out document cannot be updated by another operator unless an operator who checked out that document cancels the check-out status or checks in the document. To remove this inconvenience, document data is set in an exclusive state with respect to another user, and a password required to cancel the exclusive state is generated. The exclusive state of the document data is canceled based on an instruction of a user who instructed the exclusive state or an instruction of the other user with the password, thus updating the document data.

5 Claims, 36 Drawing Sheets

FIG. 6B

| DOCUMENT ID | VERSION ID | REGISTRATION DATE AND TIME | REGISTERED USER ID | FILE ENTITY |
|---|---|---|---|---|
| | | | | |
| | | | | |
| | | | | |
| | | | | |

| DOCUMENT ID | CHECK-OUT DATE AND TIME | CHECK-OUT USER ID | PASSWORD |
|---|---|---|---|
| | | | |
| | | | |
| | | | |
| | | | |

FIG. 8

| DOCUMENT DETAIL | |
|---|---|
| DOCUMENT ID | 0002 |
| DOCUMENT NAME | PLANNING PAPER 01 |
| STATUS | CHECK-OUT |
| CHECK-OUT DATE AND TIME | 2005 / 03 / 10   15 : 32 |
| CHECK-OUT USER | USER A |

| VERSION ID | REGISTRATION DATE AND TIME | REGISTERED USER |
|---|---|---|
| 01 | 2005 / 01 / 01   ○○ : ×× | USER A |
| 02 | 2005 / 01 / 10   ○○ : ×× | USER B |
| 03 | 2005 / 01 / 15   ○○ : ×× | USER B |
| 04 | 2005 / 03 / 08   ○○ : ×× | USER A |

BACK

FIG. 9

| DOCUMENT CHECK-OUT | |
|---|---|
| DOCUMENT ID | 0001 |
| DOCUMENT NAME | SPECIFICATION 01 |
| STATUS | NORMAL |
| FINAL CHECK-IN DATE AND TIME | 2005 / 02 / 28    09 : 08 |

☑ GENERATE CHECK-IN PASSWORD

CHECK-OUT

F I G. 13
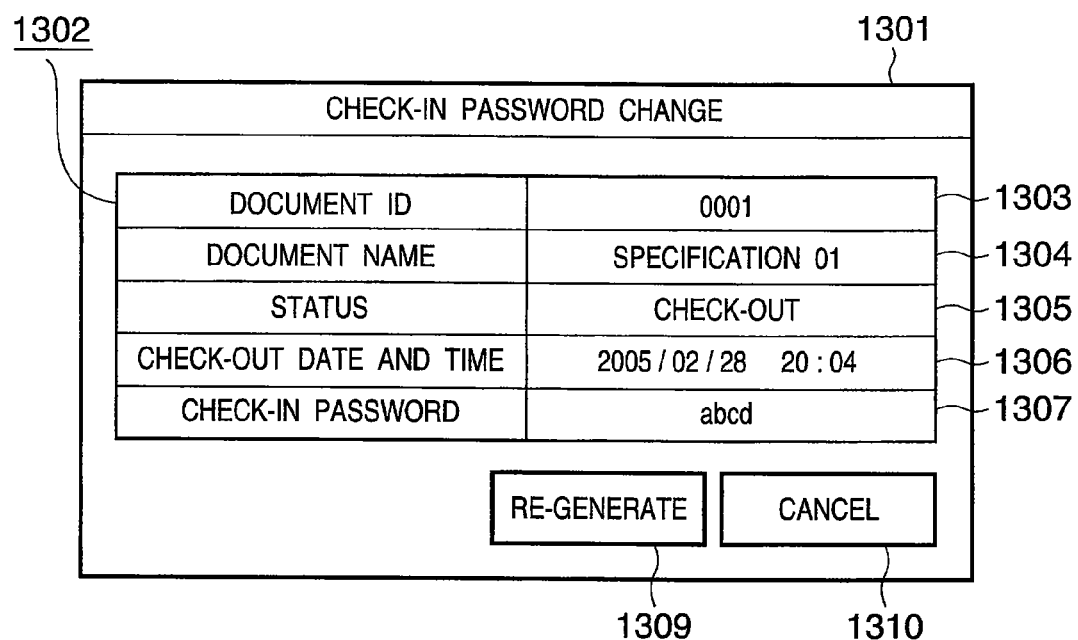

F I G. 14
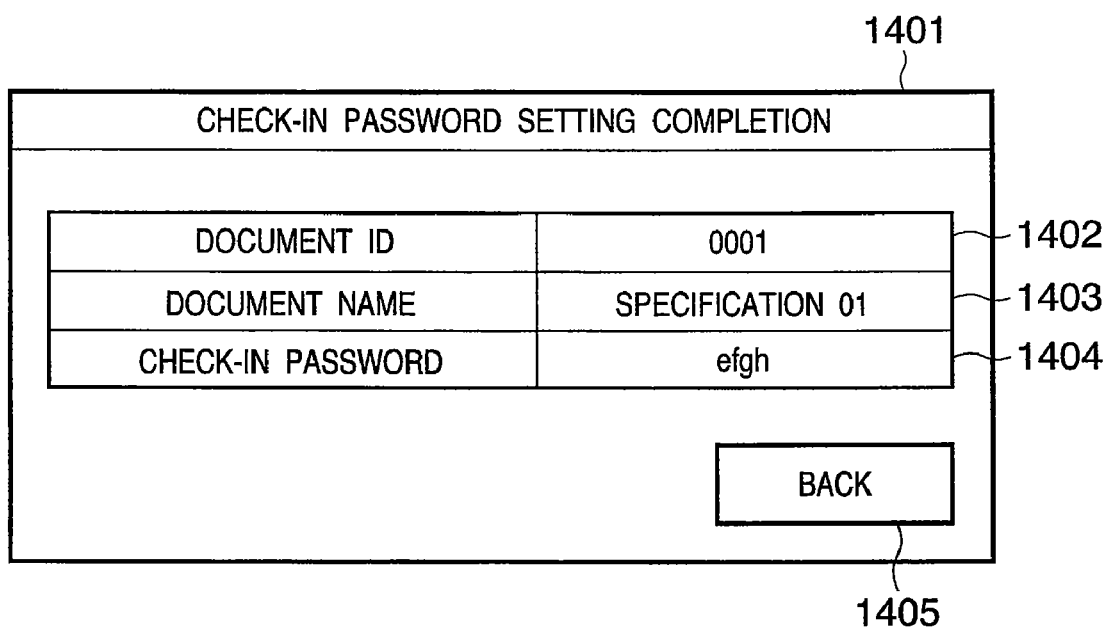

F I G. 15
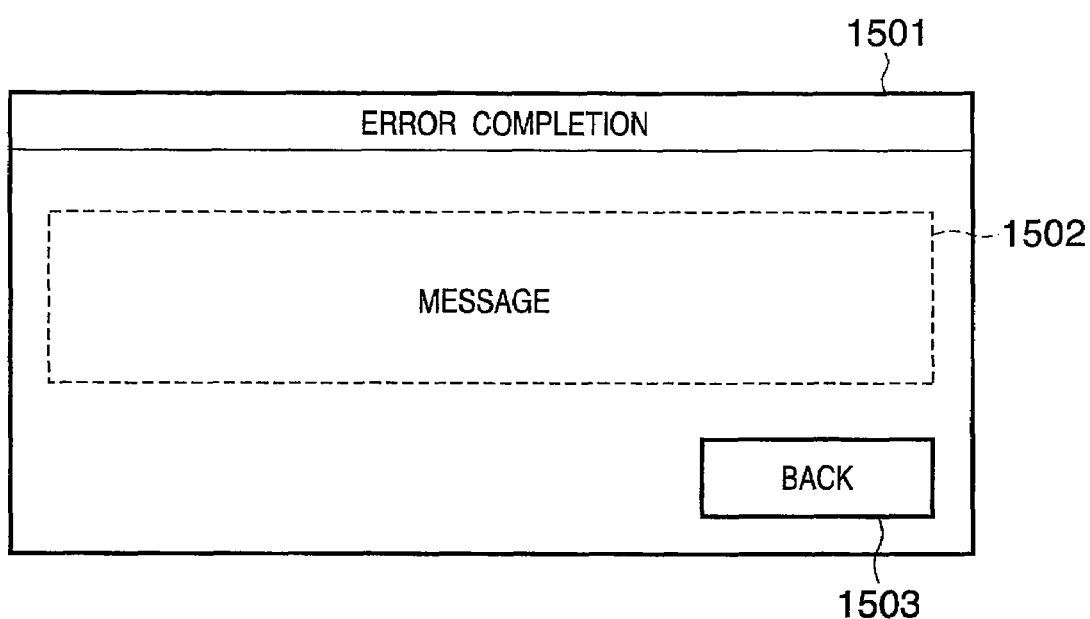

F I G. 21A

| DOCUMENT ID | CHECK-OUT DATE AND TIME | CHECK-OUT USER ID |
|---|---|---|
| | | |
| | | |
| | | |
| | | |

| DOCUMENT ID | SETTING UNIT | PERMITTED USER/GROUP ID |
|---|---|---|
| | | |
| | | |
| | | |
| | | |

| GROUP ID | MEMBER |
|---|---|
|  |  |
|  |  |
|  |  |
|  |  |

2131, 2132, 2133

F I G. 27
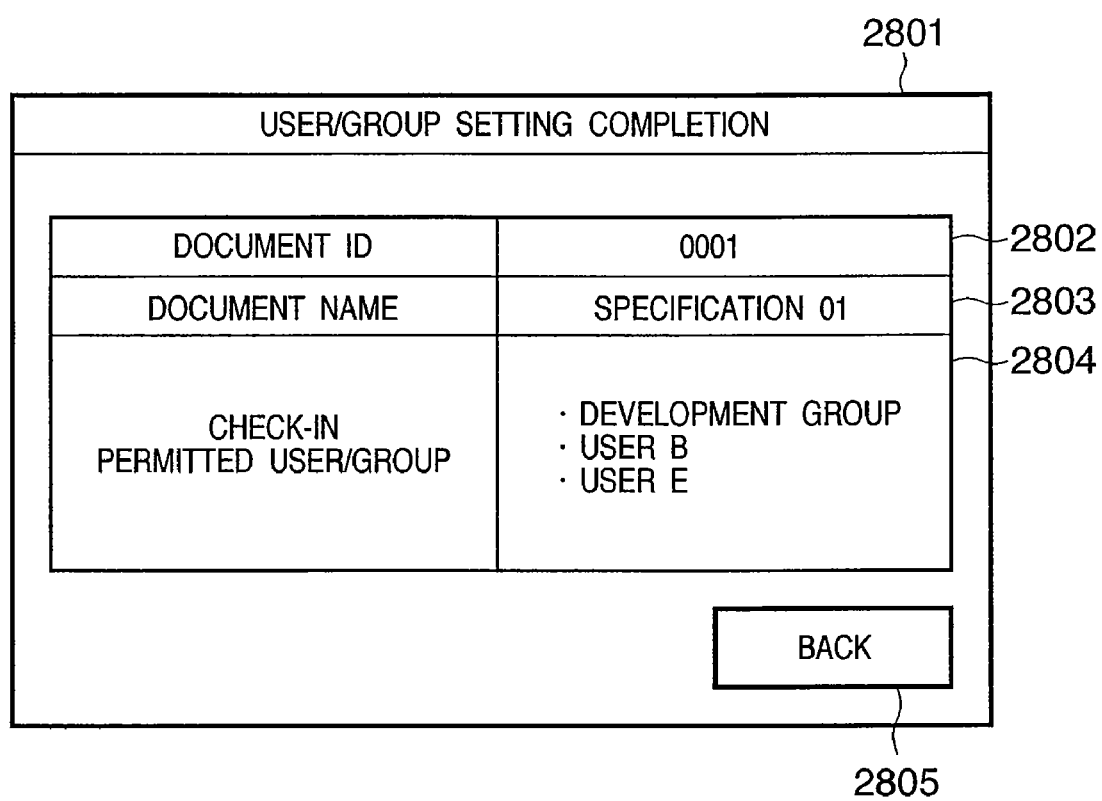

DOCUMENT MANAGEMENT METHOD AND APPARATUS THEREOF

BACKGROUND OF THE INVENTION

1. Field of the Invention

The present invention relates to document management that manages document data stored in a memory.

2. Description of the Related Art

There is a technique for registering, updating, deleting, and acquiring documents managed by a document management apparatus, i.e., for sharing documents, using a Web browser or dedicated software which runs on a client PC between networks connected to each other via the Internet, intranet, or the like.

In order to access the document management apparatus, the user must transmit user identification information such as a user ID, password, and the like, which are issued upon registering user information in that apparatus, and be authenticated. The user identification information is not only used to check an access right upon browsing documents. Upon registering or updating a given document, the user identification information is associated with that document to preserve the manipulation record of the document.

Upon updating a document, the user issues a document update declaration called check-out first to exclude update processing by another user. That is, the user who checked out the document is ready to exclusively update that document. The user modifies the checked-out document, and executes a sequence for updating the check-out document by the modified document (this sequence is called check-in, and after this processing, the exclusive control state of the document is canceled). Note that many document management apparatuses having these functions are already available.

In this way, the document management apparatus excludes the update processing by another user to a document while a given user is checking out the document. For this reason, the update processing of that document by another user stands by until the user who checked out the document cancels the check-out status or checks in the document (i.e., to cancel the exclusive control state). If the user neither cancels the check-out status nor checks in the document while he or she is checking out that document, the other user cannot update that document.

Especially, in a project in which a plurality of users update specifications and the like, a document update assigned to a given user is to be immediately reflected in other documents to ensure consistency among documents. However, other operators cannot update a checked-out document unless an operator who checked out that document cancel the check-out status or checks in the document, thus delaying the document update operation.

If another operator illicitly uses the user identification information of the operator who checked out the document, he or she can check in that document. However, such process is not permitted in terms of security. Of course, it is possible for the administrator of the document management apparatus to forcibly cancel the check-out status. However, the update operation of the operator who checked out the document is wasted, and labor hours of the administrator are undesirably required.

SUMMARY OF THE INVENTION

According to a first aspect of the present invention, a method of managing document data stored in a memory includes: setting, based on an instruction of a user, update processing of document data stored in the memory in an exclusive state with respect to another user; generating a password required to cancel the exclusive state of the document data and storing the generated password in the memory; and updating the document data by canceling the exclusive state of the document data based on the instruction of the user who instructed the exclusive state or an instruction of the other user with the password.

According to a second aspect of the present invention, a method of managing document data stored in a memory includes: setting, based on an instruction of a user, update processing of document data stored in the memory in an exclusive state with respect to another user; setting a user who is permitted to cancel the exclusive state of the document data based on an instruction of the user who instructed the exclusive state, and storing the information of the set user in the memory; and updating the document data by canceling the exclusive state of the document data based on the instruction of the user who instructed the exclusive state or an instruction of the user who is permitted to cancel the exclusive state.

Thus, another user can cancel an exclusive state of document data set by a given user while maintaining security.

Further features of the present invention will become apparent from the following description of exemplary embodiments with reference to the attached drawings.

BRIEF DESCRIPTION OF THE DRAWINGS

FIG. 6B shows the format of a version information table stored in the document storage unit;

FIG. 6C shows the format of a check-out information table stored in a check-out information memory;

FIG. 8 shows a detail display window of document information;

FIG. 9 shows a check-out window;

FIG. 13 shows a change window of a password for document registration;

FIG. 14 shows a setting completion window of a check-in password;

FIG. 15 shows an error display window;

FIG. 21A shows the format of a check-out information table stored in a check-out information memory;

FIG. 21B shows the format of a check-in permitted user/group table;

FIG. 21D shows the format of a group member table stored in the group information memory;

FIG. 27 shows a user/group setting completion window;

DESCRIPTION OF THE EMBODIMENTS

Document management processing according to preferred embodiments of the present invention will be described in detail hereinafter with reference to the accompanying drawings.

First Embodiment

[System Arrangement]

Figure 1:
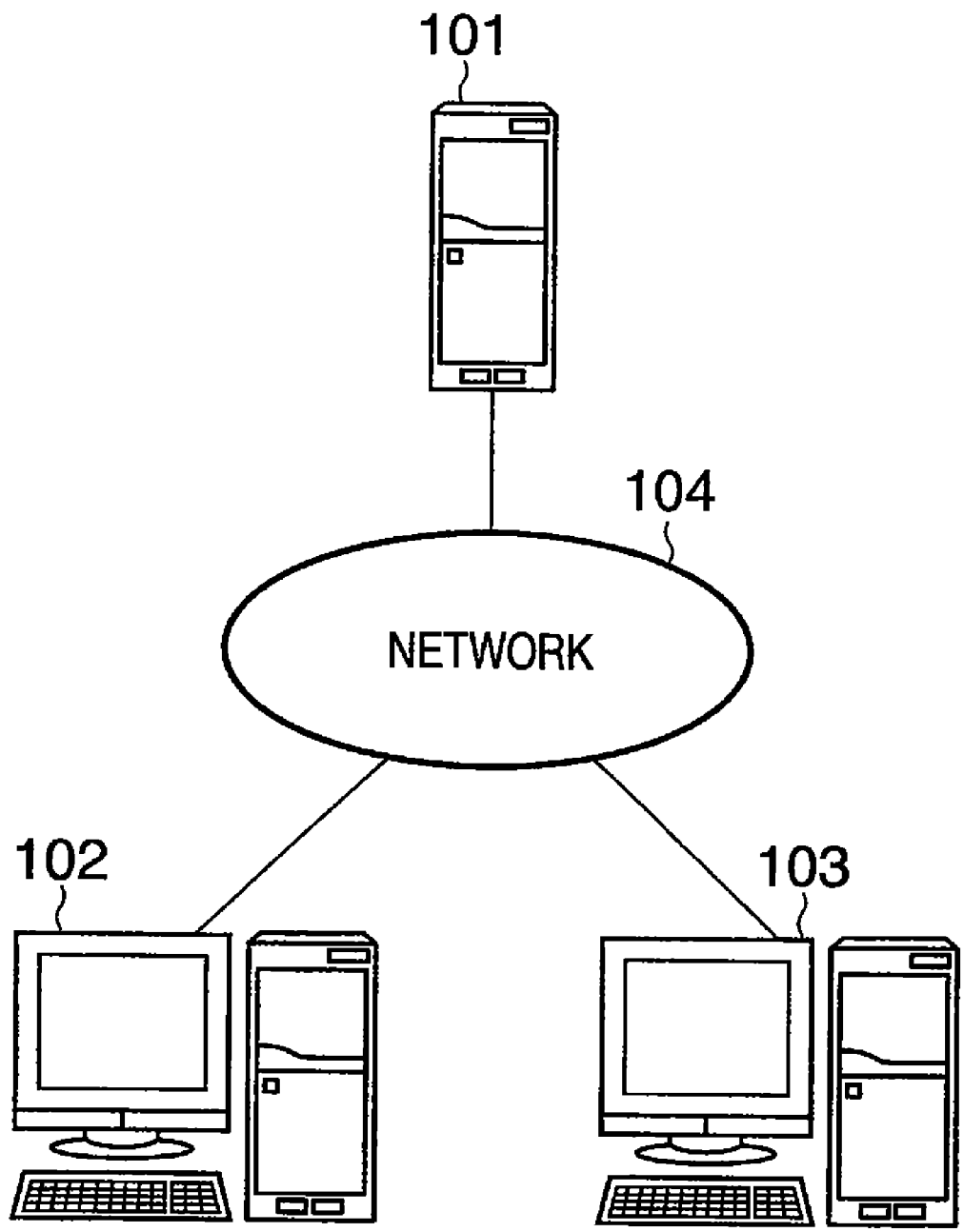
FIG. 1 is a diagram showing the arrangement of a system including a document management apparatus according to the first embodiment.

FIG. 1 shows the arrangement of a system including a document management apparatus 101 according to the first embodiment.

The document management apparatus 101 integrally manages documents. Clients 102 and 103 are devices used to make operations such as display, registration, updating, deleting, and the like of document information. The document management apparatus 101 and clients 102 and 103 are connected to each other via a network 104. Note that the number of clients is not particularly limited as long as one or more clients are connected.

[Arrangement of Document Management Apparatus]

Figure 2:
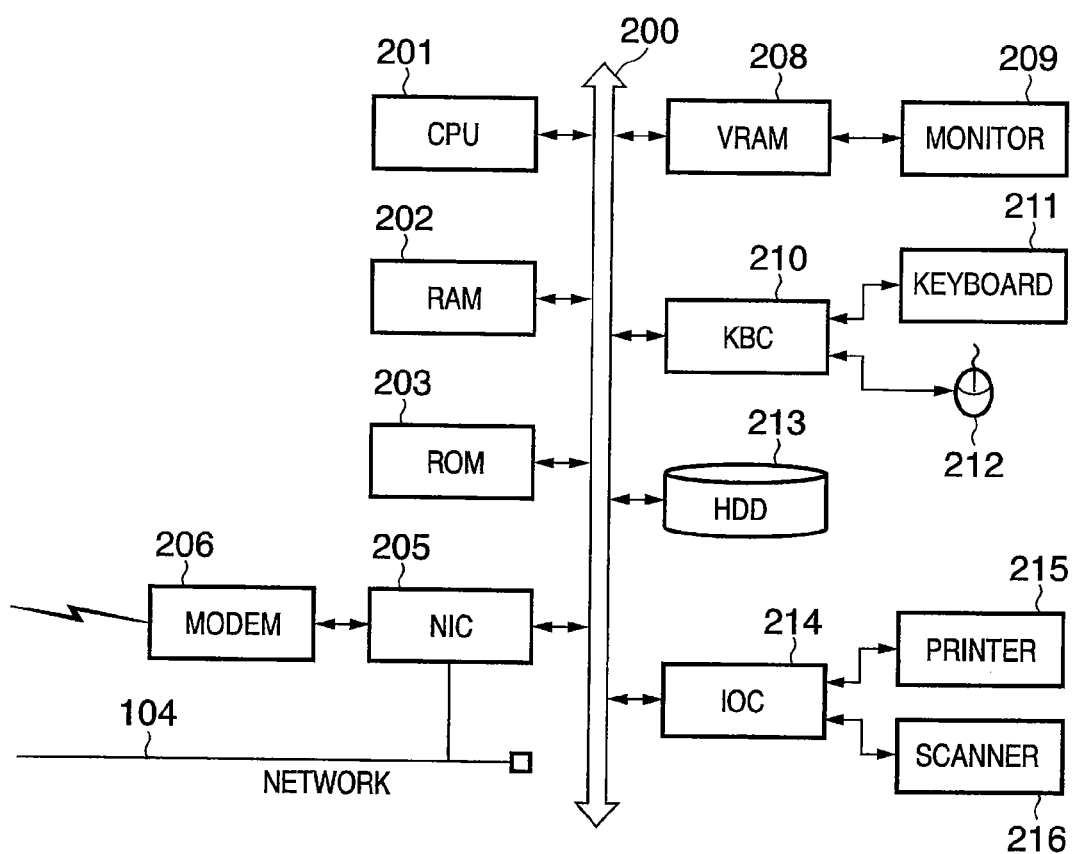
FIG. 2 is a block diagram showing the arrangement of the document management apparatus.

FIG. 2 is a block diagram showing the arrangement of the document management apparatus 101.

A CPU 201 executes programs stored in a ROM 203 and a hard disk drive (HDD) 213 using a RAM 202 as a work memory. By controlling components to be described below via a system bus 200, the CPU 201 makes various kinds of control and arithmetic operations of the document management apparatus 101.

The CPU 201 displays a user interface, the process and result of arithmetic processing, apparatus status, documents, and the like on a monitor 209 via a video RAM (VRAM) 208. The user inputs instructions and data to the user interface displayed on the monitor 209 using a keyboard 211 and mouse 212. The CPU 201 acquires instructions and data input by the user via a keyboard controller (KBC) 210. Note that a combination of the monitor and user inputting unit may adopt that of a liquid crystal display and touch panel.

The CPU 201 can control a scanner 216 as an information inputting device and a printer 215 as an information outputting device via an input/output controller (IOC) 214. An original document image is inputted by scanning an original document using the scanner 216. The printer 215 can print a document image. Note that the IOC 214 can adopt a serial bus such as USB, IEEE 1394, and the like. With the serial bus, not only the inputting and outputting devices such as the scanner, printer, and the like but also peripheral devices such as an external HDD, optical disk drive, and the like can be connected.

A network interface card (NIC) 205 serves as an interface with the network 104. The NIC 205 also controls a MODEM 206. The MODEM 206 exchanges data with devices such as an external MODEM, ISDN terminal adapter, and the like via a public network.

[Functional Arrangement of Document Management Apparatus]

Figure 3:
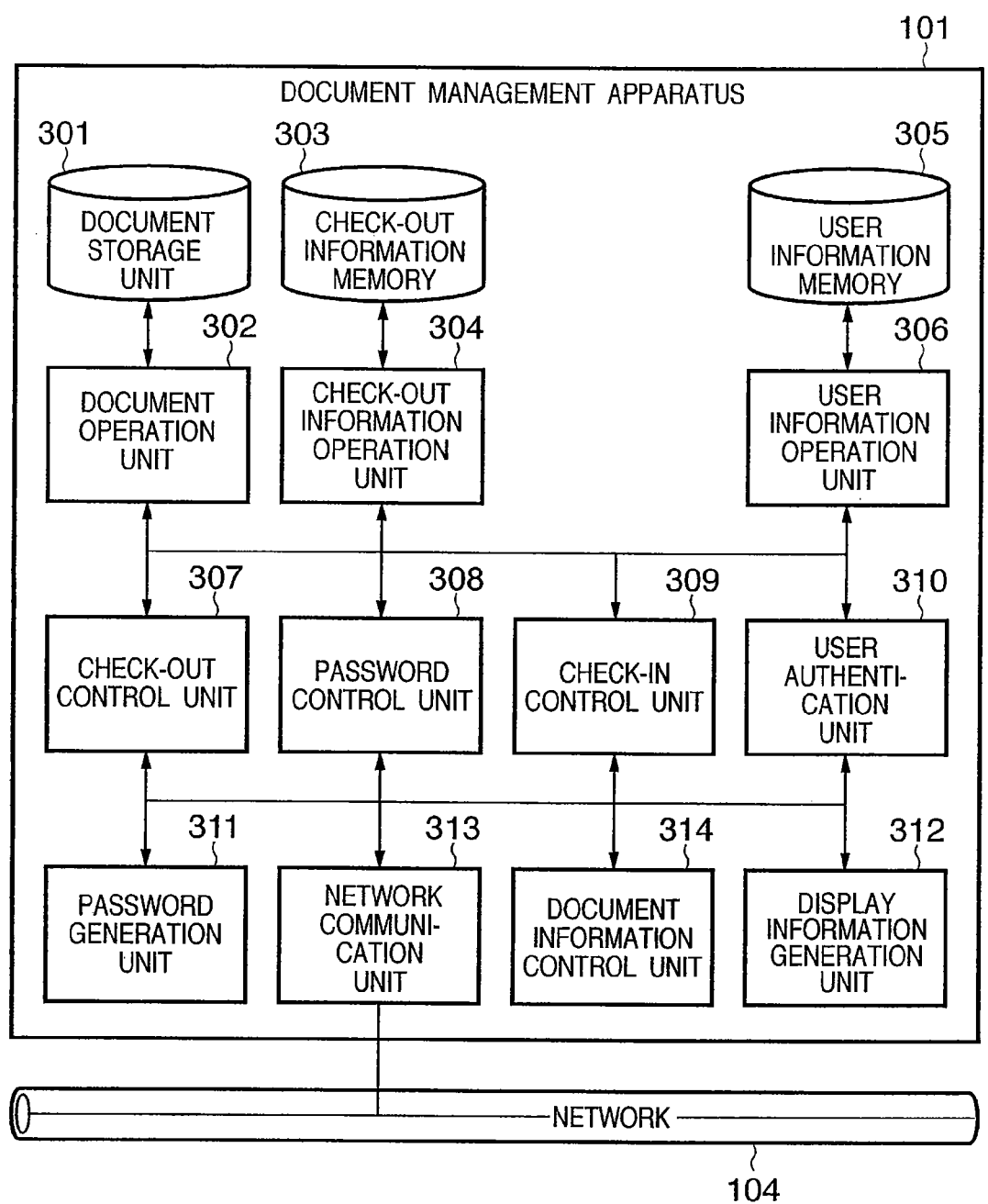
FIG. 3 is a block diagram for explaining the functional arrangement of the document management apparatus.

FIG. 3 is a block diagram for explaining the functional arrangement of the document management apparatus 101. Note that a storage unit and memories to be described below are assured on the RAM 202 and HDD 213. Components other than the storage unit and memories are implemented by programs which are loaded onto the RAM 202 and are executed by the CPU 201.

A document storage unit 301 is a memory which stores registered document information and document files. A document operation unit 302 executes input/output processing such as registration, updating, deleting, acquisition, and the like of document information and document files with respect to the document storage unit 301.

A check-out information memory 303 stores information about check-out processing of documents stored in the document storage unit 301. A check-out information operation unit 304 executes input/output processing such as registration, updating, deleting, acquisition, and the like of check-out information with respect to the check-out information memory 303.

A user information memory 305 stores user information of users who use the document management apparatus 101. A user information operation unit 306 executes input/output processing such as registration, updating, deleting, acquisition, and the like with respect to the user information memory 305.

A check-out control unit 307 controls check-out processing based on a check-out request from the client using the document operation unit 302, the check-out information operation unit 304, the user information operation unit 306, a password generation unit 311, and a display information generation unit 312.

A password control unit 308 controls updating processing of password information to be set for a document corresponding to the check-out request from the client using the check-out information operation unit 304, user information operation unit 306, password generation unit 311, and display information generation unit 312.

A check-in control unit 309 controls check-in processing based on a check-in request from the client using the document operation unit 302, check-out information operation unit 304, user information operation unit 306, and display information generation unit 312.

A user authentication unit 310 executes user authentication processing when the client establishes a connection to the document management apparatus 101, using the user information operation unit 306 and display information generation unit 312.

A password generation unit 311 generates a check-in password managed by the check-out information memory 303.

The display information generation unit 312 generates and shapes window display data which is provided to the client and is used to manage documents. Especially, the display information generation unit 312 provides window display data suited to the display function of the client. For example, the display information generation unit 312 generates window display data in a hypertext format such as HTML (hyper text markup language) or the like, a binary format corresponding to dedicated client software, and the like.

A network communication unit 313 connects the MODEM 206 or NIC 205 and communicates with the client via the public network or the network 104. The network communication unit 313 notifies the respective units of processing requests received from the client, and sends the processing results of the respective units to the client.

A document information control unit 314 generates a detailed display window (to be described in detail later) of document information to be sent to the client using the document operation unit 302 and check-out information operation unit 304.

[Arrangement of Client]

Figure 4:
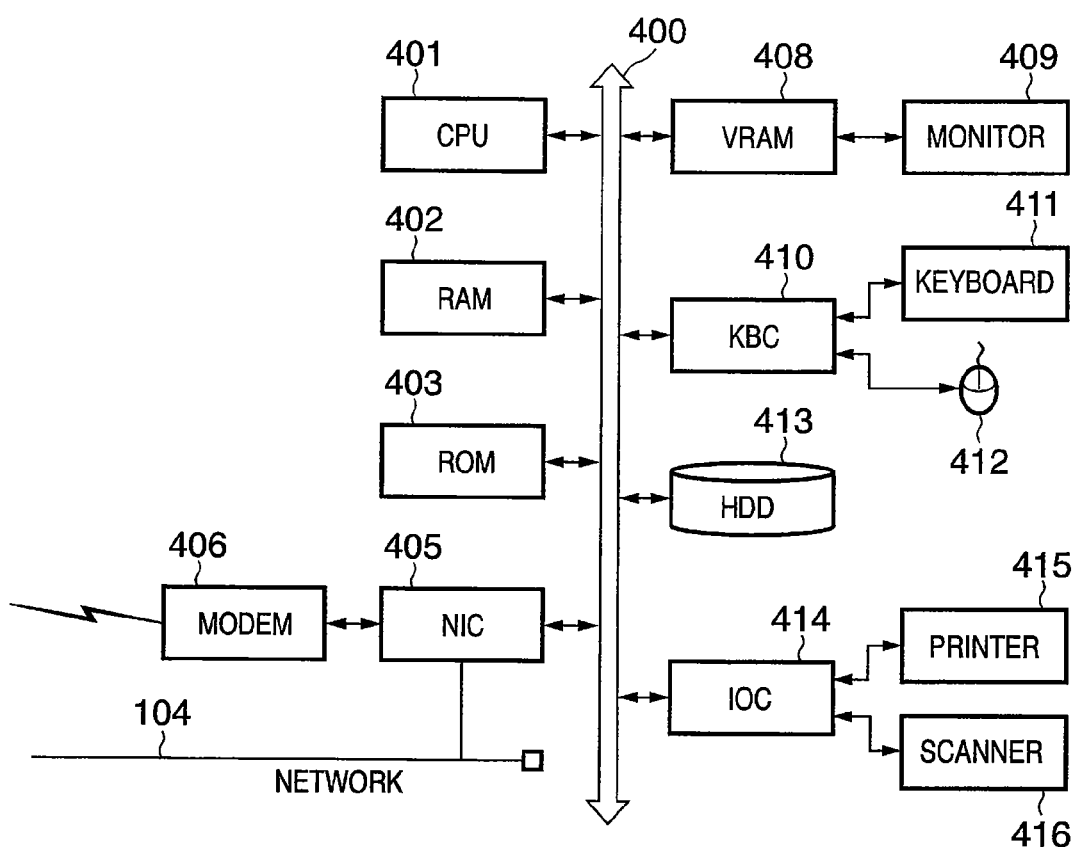
FIG. 4 is a block diagram showing the arrangement of a client.

FIG. 4 is a block diagram showing the arrangement of the clients 102 and 103.

A CPU 401 executes programs stored in a ROM 403 and a hard disk drive (HDD) 413 using a RAM 402 as a work memory. By controlling components to be described below via a system bus 400, the CPU 401 makes various kinds of control and arithmetic operations of the client 102 or 103.

The CPU 401 displays a user interface, the process and result of arithmetic processing, client status, documents, and the like on a monitor 409 via a video RAM (VRAM) 408. The user inputs instructions and data to the user interface displayed on the monitor 409 using a keyboard 411 and mouse 412. The CPU 401 acquires instructions and data input by the user via a keyboard controller (KBC) 410. Note that a combination of the monitor and user inputting unit may adopt that of a liquid crystal display and touch panel.

The CPU 401 can control a scanner 416 as an information inputting device and a printer 415 as an information outputting device via an input/output controller (IOC) 414. An original document image is inputted by scanning an original document using the scanner 416. The printer 415 can print a document image. Note that the IOC 414 can adopt a serial bus such as USB, IEEE 1394, and the like. With the serial bus, not only the inputting and outputting devices such as the scanner, printer, and the like but also peripheral devices such as an external HDD, optical disk drive, and the like can be connected.

A network interface card (NIC) 405 serves as an interface with the network 104. The NIC 405 also controls a MODEM 406. The MODEM 406 exchanges data with devices such as an external MODEM, ISDN terminal adapter, and the like via a public network.

[Functions of Client]

Figure 5:
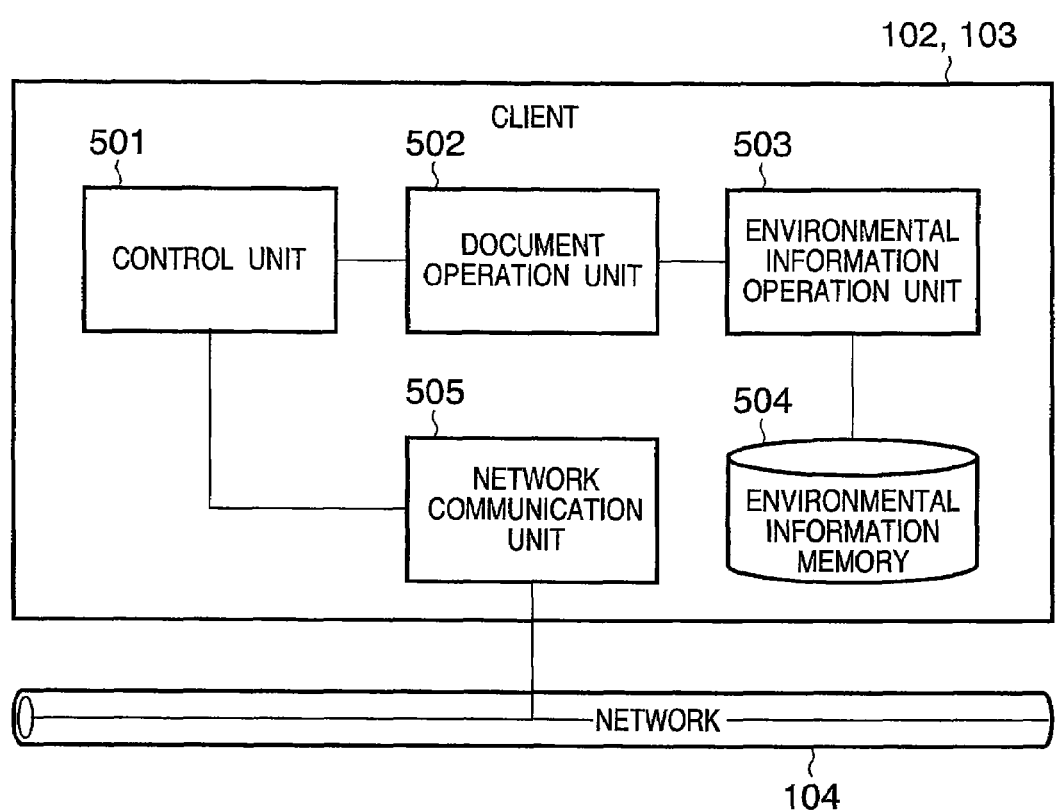
FIG. 5 is a block diagram for explaining the functional arrangement of the client.

FIG. 5 is a block diagram for explaining the functional arrangement of the clients 102 and 103. Note that memories to be described below are assured on the RAM 402 or HDD 413. Components other than the memories are implemented by programs which are loaded onto the RAM 402 and are executed by the CPU 401.

A control unit 501 interprets window display data received from the document management apparatus 101, and displays an image on the monitor 409. The control unit 501 executes processing for transmitting information indicating document information and a document file input by the user using the keyboard 411 and mouse 412 to the document management apparatus 101 via a network communication unit 505.

A document operation unit 502 executes search processing for specifying a document to be registered in the document management apparatus 101 with respect to the HDD 413, RAM 402, a server on the network 104, and the like, and specifies a document file.

An environmental information memory 504 stores destination information of the document management apparatus 101 to which the client is connected. An environmental information operation unit 503 executes input/output processing of environmental information to the environmental information memory 504.

The network communication unit 505 connects the MODEM 406 or NIC 405 and communicates with the document management apparatus 101 via the public network or network 104. The network communication unit 505 notifies the control unit 501 of the processing result received from the document management apparatus 101, and sends a processing request of the control unit 501 to the document management apparatus 101.

[Data Format]

Figure 6A:
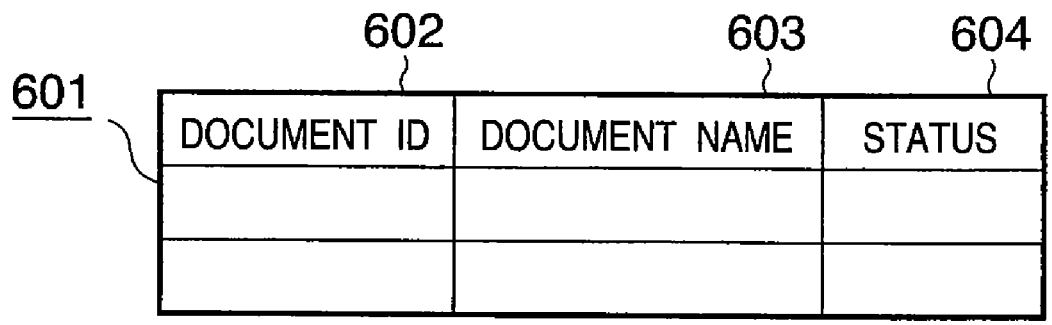
FIG. 6A shows the format of a document information table stored in a document storage unit.

FIG. 6A shows the format of a document information table 601 stored in the document storage unit 301 of the document management apparatus 101.

The document information table 601 has a format of holding document information for respective documents, and includes fields of a document ID 602, document name 603, and status 603 indicating the status of document information. The document ID 602 uniquely represents a document to be created and updated.

FIG. 6B shows the format of a version information table 611 stored in the document storage unit 301 of the document management apparatus 101.

The version information table 611 has a format of holding document information for respective versions upon updating documents, and includes fields of a document ID 612, version ID 613, registration date and time 614, and registered user ID 615. Furthermore, the table 611 includes a field of a file entity (or file pointer) 616 associated with at least the document ID 612 and version ID 613. The document ID 612 is associated with the document ID 602 of the document information table 601. The document ID 612 is associated with the document ID 602, and can uniquely represent a document at the time of creation or updating in combination with the version ID.

FIG. 6C shows the format of a check-out information table 621 stored in the document storage unit 301 of the document management apparatus 101.

The check-out information table 621 has a format that holds information associated with check-out documents for respective documents. The table 621 includes fields of a document ID 622, check-out date and time 623, check-out user ID 624, and check-in password 625 (to be described later). The document ID 622 is associated with the document ID 602 of the document information table 601. Note that documents registered in the check-out information table 621 are now being checked out. The document ID 622 is associated with the document ID 602.

Figure 6D:
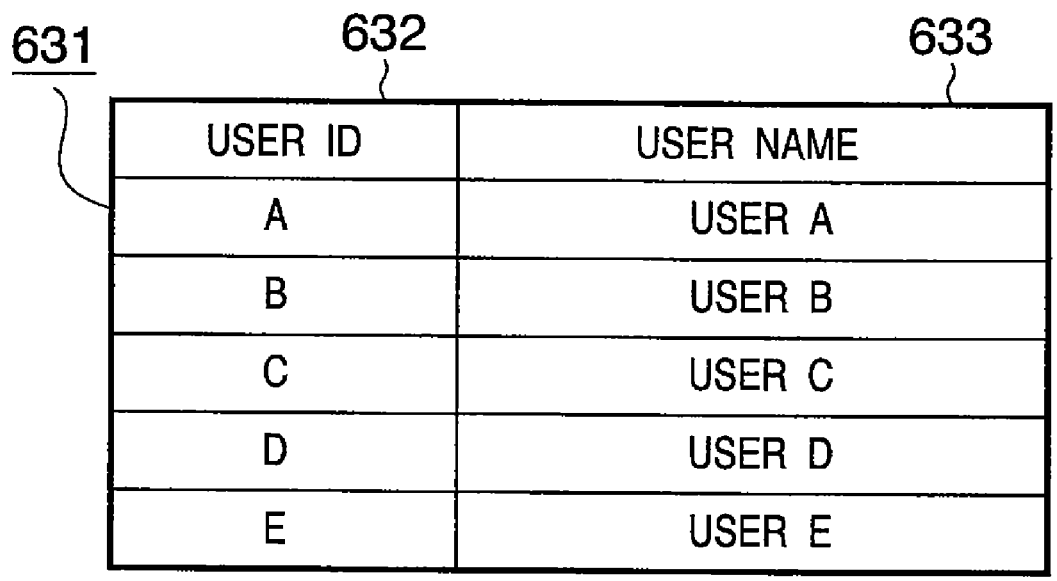
FIG. 6D shows the format of a user information table stored in a user information memory.

FIG. 6D shows the format of a user information table 631 stored in the document storage unit 301 of the document management apparatus 101.

The user information table 631 holds information of users who can access the document management apparatus 101 to make document operations, and includes fields of a user ID 632 and user name 633. The user ID 632 uniquely represents one user information. The user information registered in the user information table 631 is used as the registered user ID 615 of the version information table 611 and the check-out user ID 624 of the check-out information table 621.

[User Interface Window]

User interface windows to be displayed on the clients 102 and 103 will be described below. Note that display windows to be described below have minimum required configurations, and can display information other than those to be described below and illustrated in the drawings. Also, information is transmitted to the document management apparatus 101 in response to an operation instruction on each user interface window. In this case, the transmission information is appended with identification information of the client (for example, the address information of the client) and user identification information (user ID).

Document Browse Window

Figure 7:
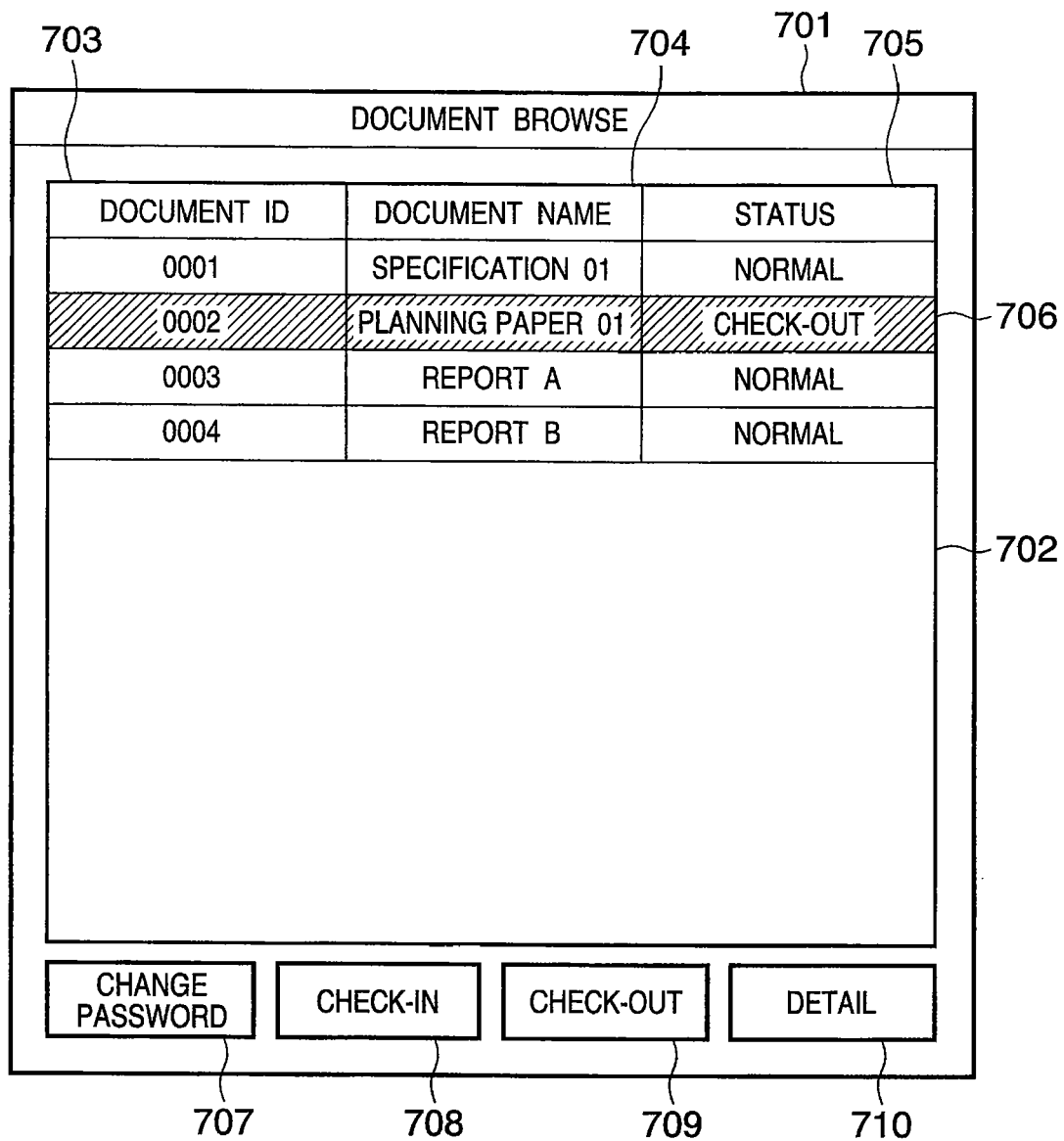
FIG. 7 shows a document browse window.

FIG. 7 shows a document browse window 701, which is used when the user browses document information managed by the document management apparatus 101.

A document information display area 702 displays a list of document information to be managed by the document management apparatus 101, and is used by the user to identify documents. Display columns include a document ID 703, document name 704, and status 705. When the user selects document information 706, a display field of the document information 706 is highlighted (indicated by black-and-white reverse in FIG. 7) to indicate that the document is selected.

A "change password" button 707 launches password change processing of a document corresponding to the selected document information. When the user presses the button 707, information indicating the document information selected at that time is passed to the password control unit 308 of the document processing apparatus 101.

A "check-in" button 708 launches check-in processing of a document corresponding to the selected document information. When the user presses the button 708, information indicating the document information selected at that time is passed to the check-in control unit 309 of the document processing apparatus 101.

A "check-out" button 709 launches check-out processing of a document corresponding to the selected document information. When the user presses the button 709, information indicating the document information selected at that time is passed to the check-out control unit 307 of the document processing apparatus 101.

A "detail" button 710 launches processing for displaying detailed information of the selected document information. When the user presses the button 710, information indicating the document information selected at that time is passed to the document information control unit 314 of the document processing apparatus 101.

Detail Display Window of Document Information

FIG. 8 shows a detail display window 801 of document information, which is displayed when the user presses the "detail" button 710 on the document browse window 701.

A document information display area 802 displays information held by a document and status of the document, and includes display fields of a document ID 803, document name 804, status 805, check-out date and time 806, and check-out user 807. Note that the check-out date and time 806 and check-out user 807 are displayed only when the status 805 is "check-out", and they are blank in other cases.

A version information display area 808 displays the update history of the document, and has display columns of a version ID 809, registration date and time 810, and registered user ID 811.

A "back" button 812 is pressed to close the detail display window 801, and to return to the document browse window 701.

Check-Out Window

FIG. 9 shows a check-out window 901, which is displayed upon pressing of the "check-out" button 709 on the document browse window 701.

The check-out window 901 has display fields of a document ID 902, document name 903, status 904, and final check-in date and time 905. Note that the respective display fields display the latest information of the document selected on the document browse window 701.

A "generate check-in password" check box 906 is used to generate a password required to check in the document by a user other than the user who checked out that document.

A "check-out" button 907 launches check-out processing of a document with the document ID displayed in the document ID display field 902. When the user presses the button 907, document information displayed on the check-out window 901 and the check status of the check box 906 are passed to the check-out control unit 307 of the document management apparatus 101.

Check-Out Completion Window

Figure 10:
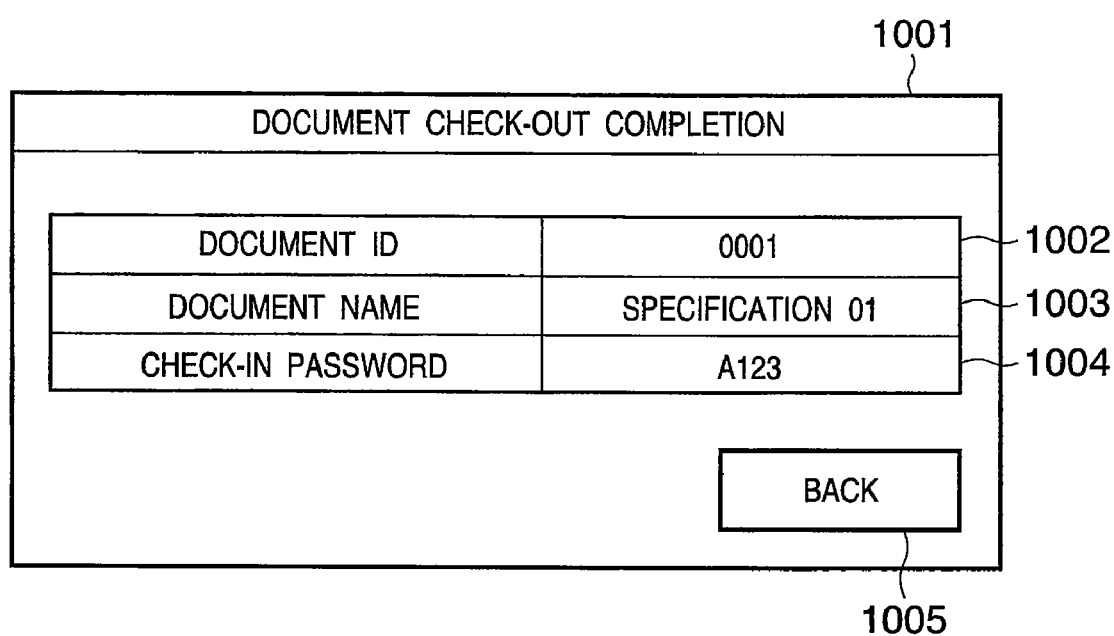
FIG. 10 shows a check-out completion window.

FIG. 10 shows a check-out completion window 1001, which displays the result of the check-out processing launched upon pressing of the "check-out" button 907 on the check-out window 901.

The check-out completion window 1001 has display fields of a document ID 1002, document name 1003, and check-in password 1004. The display fields of the document ID 1002 and document name 1003 display document information corresponding to the check-out document. The check-in password display field 1004 displays a check-in password generated by the password generation unit 311 of the document management apparatus 101 when the user checks the check box 906 on the check-out window 901. Note that the check-in password display field 1004 itself is not displayed when the user does not check the check box 906.

A "back" button 1005 is pressed to close the check-out completion window 1001, and to return to the document browse window 701.

Check-In Window

Figure 11:
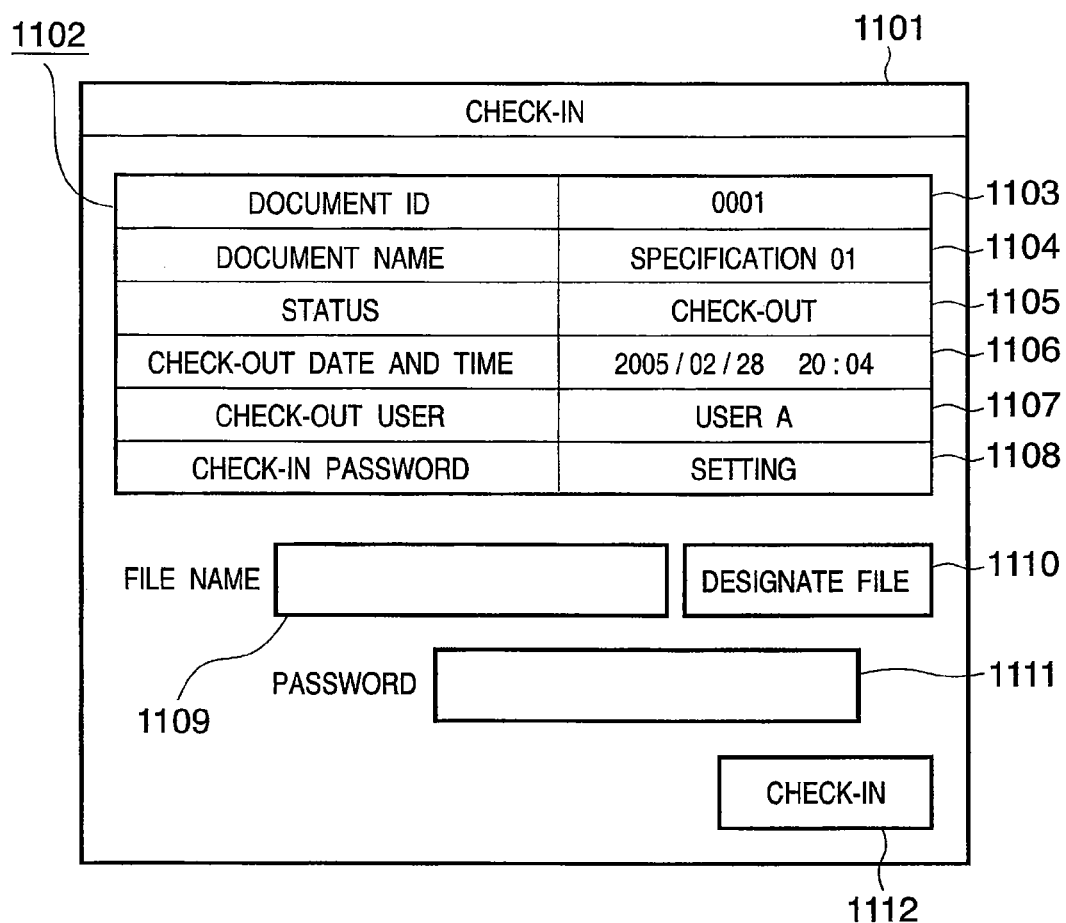
FIG. 11 shows a check-in window.

FIG. 11 shows a check-in window 1101, which is displayed when the user presses the "check-in" button 708 on the document browse window 701.

A document information display area 1102 displays the latest information of the document selected on the document browse window 701. The window 1102 has display fields of a document ID 1103, document name 1104, status 1105, check-out date and time 1106, check-out user 1107, and check-in password 1108.

When the check-out information of the document is set with a check-in password, "setting" is displayed in the check-in password display field 1108. However, an actual check-in password is not displayed. When the check-out information is not set with any check-in password, the check-in password display field 1108 itself is not displayed.

In a file name field 1109, the user inputs information of a document to be checked in, e.g., the file name or full path name of the document. The user may directly input the file name, or may designate a file stored in a local disk (HDD 413) or a server on the network by pressing a "designate file" button 1110. Note that the function provided by the "designate file" button 1110 is that provided by an operating system (OS) of the client.

In a password input field 1111, a user other than the user who checked out the document inputs a check-in password indispensable when he or she checks in that document. When the user who checked out the document checks in that document, no password input field 1111 is displayed.

A "check-in" button 1112 launches check-in processing of a document with the document ID displayed in the document ID display field 1103. When the user presses the button 1112, the document information displayed on the check-in window 1101 and the password when the password input field 1111 is displayed are passed to the check-in control unit 309 of the document management apparatus 101.

Check-In Completion Window

Figure 12:
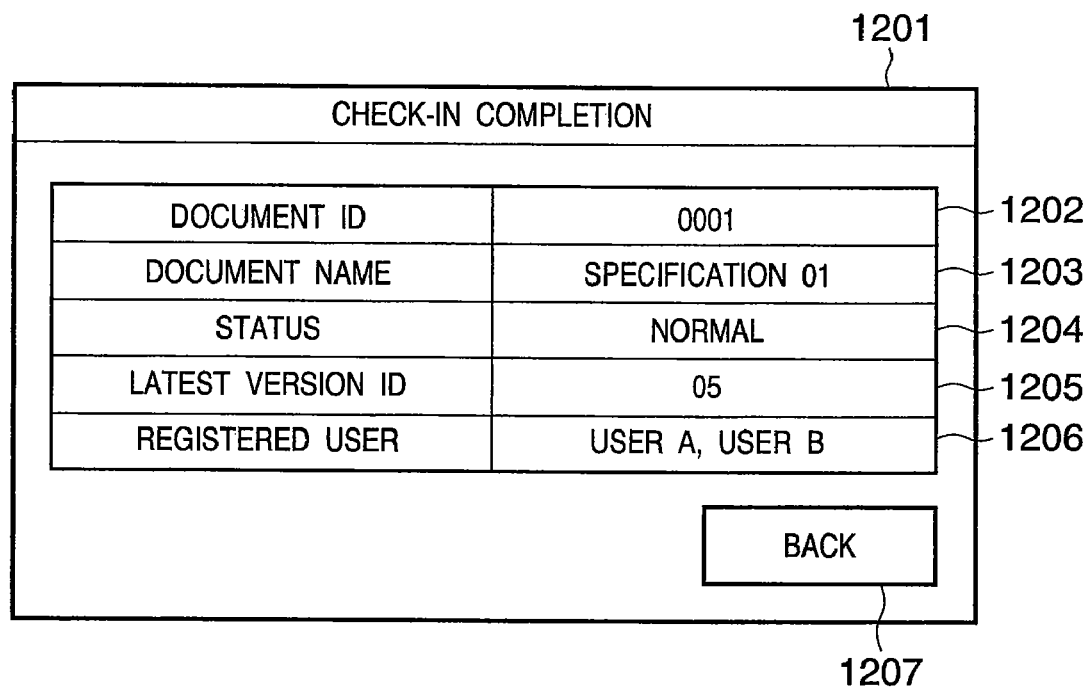
FIG. 12 shows a check-in completion window.

FIG. 12 shows a check-in completion window 1201, which displays the result of the check-in processing launched upon pressing of the "check-in" button 1112 on the check-in window 1101.

The check-in completion window 1201 has display fields of a document ID 1202, document name 1203, status 1204, latest version ID 1205, and registered user 1206 of the latest version. When the user who checked out the document is different from the user who checked in that document, the user IDs of these two users are described together in the registered user display field 1206.

A "back" button 1207 is pressed to close the check-in completion window 1201, and to return to the document browse window 701.

Check-In Password Change Window

FIG. 13 shows a document registration password change window 1301, which is displayed upon pressing of the "change password" button 707 on the document browse window 701. The document registration password change window 1301 is used when the check-in password need be changed, for example, when the user who checked out the document forgets the check-in password, when no check-in password is set, and so forth.

A document information display area 1302 has a document ID input field 1303, and display fields of a document name 1304, status 1305, check-out date and time 1306, and currently set check-in password 1307.

When the user who checked out the document inputs the document ID in the document ID input field 1303, corresponding pieces of information are displayed on the respective display fields. If the document corresponding to the input document ID is not checked out, if a document corresponding to the input document ID does not exist, if the user who inputs the document ID is not the user who checked out the document, or the like, an error message that advises accordingly is displayed.

If no check-in password is set, "not set" is displayed in the check-in password display field 1307.

A "re-generate" button 1309 launches re-generation processing of a check-in password. When the user presses the button 1309, the document information displayed on the document registration password change window 1301 is passed to the password control unit 308 of the document management apparatus 101.

A "cancel" button 1310 launches password canceling processing for discarding a check-in password. When the user presses the button 1310, the document information displayed on the document registration password change window 1301 is passed to the password control unit 308 of the document management apparatus 101.

Check-In Password Setting Completion Window

FIG. 14 shows a check-in password setting completion window 1401, which is displayed upon pressing of the "re-generate" button 1309 or "cancel" button 1310 on the check-in password change window 1301.

The check-in password setting completion window 1401 includes display fields of a document ID 1402, document name 1403, and check-in password 1404. Upon pressing the "re-generate" button 1309, the check-in password display field 1404 displays the re-generated password. On the other hand, upon pressing of the "cancel" button 1310, the check-in password display field 1404 displays "not set".

A "back" button 1405 is pressed to close the check-in password setting completion window 1401, and to return to the document browse window 701.

Error Display Window

FIG. 15 shows an error display window 1501, which notifies the client of information associated with an error when an error has occurred during processing of the document management apparatus 101.

An error message display area 1502 displays information associated with an error that has occurred. Note that the message displayed on the error message display area 1502 is not limited to a character string, but it may adopt other expressions such as an image and the like.

A "back" button 1503 is pressed to close the error display window 1501, and to return to the document browse window 701.

[Check-Out Processing]

Figure 16:
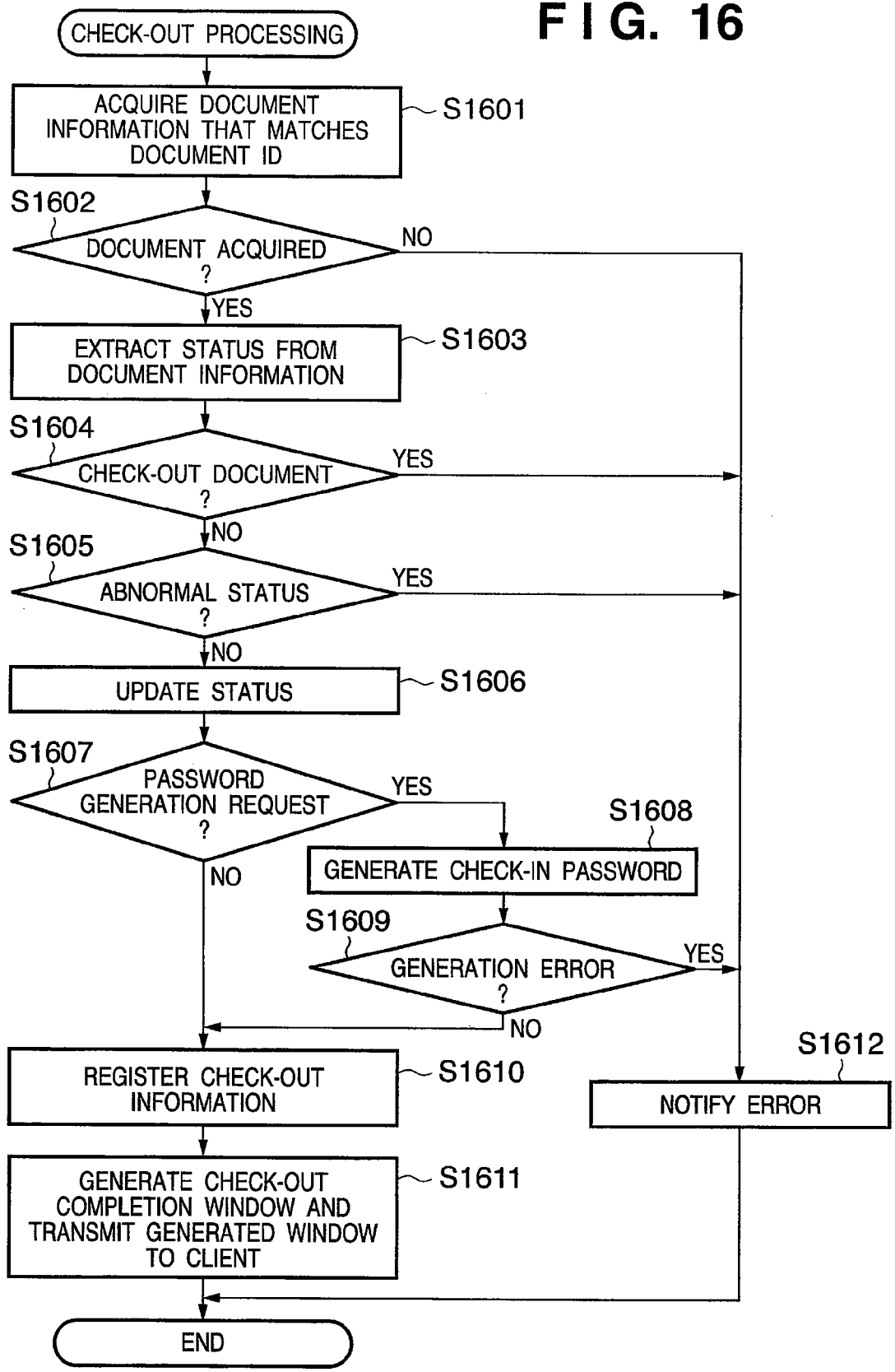
FIG. 16 is a flowchart for explaining check-out processing.

FIG. 16 is a flowchart for explaining the check-out processing. Upon pressing of the "check-out" button 907 on the check-out window 901 shown in FIG. 9, the CPU 201 of the document management apparatus 101 executes this processing.

The CPU 201 acquires document information (601 shown in FIG. 6A) that matches the document ID 902 received from the client from the document storage unit 301 via the document operation unit 302 (S1601). The CPU 201 checks if a document corresponding to the document ID 902 can be acquired (S1602). If the document of interest can be acquired, the process advances to step S1603; otherwise, the CPU 201 notifies the client of an error (S1612).

If the document corresponding to the document ID 902 can be acquired, the CPU 201 extracts the status (604 shown in FIG. 6A) from the acquired document information (S1603) to check if the document of interest has been checked out (S1604). If the document of interest has not been checked out yet, the process advances to step S1605; otherwise, the CPU 201 notifies the client of an error (S1612).

If the document corresponding to the document ID 902 has not been checked out yet, the CPU 201 checks If the extracted status is normal (S1605). If the status assumes a normal value, the process advances to step S1606; otherwise, the CPU 201 notifies the client of an error (S1612).

If the status of the document corresponding to the document ID 902 assumes a normal value, the CPU 201 changes the status value to "check-out". The CPU 201 updates the status of the document of interest by storing the document information whose status value has been changed in the document storage unit 301 via the document operation unit 302 (S1606).

Next, the CPU 201 checks if it receives a check-in password generation request (S1607). If the CPU 201 receives the generation request, the process advances to step S1608; otherwise, the process advances to step 1610.

If the CPU 201 receives the check-in password generation request, it controls the password generation unit 311 to generate a password (S1608). The password to be generated is a character string which can be input by the user who accesses the document management apparatus 101. The CPU 201 then checks if the generated password assumes a normal value (S1609). If the password assumes a normal value, the process advances to step S1610; if the password assumes an abnormal value (e.g. generation of the password has failed), the CPU 201 notifies the client of an error (S1612).

The CPU 201 then acquires a check-out date and time (623 shown in FIG. 6C) to be registered in the check-out information (621 shown in FIG. 6C) from a system date and time of the document management apparatus 101. The CPU 201 registers the document ID, date and time, user ID, and the check-in password (if it is generated) in the check-out information memory 303 via the check-out information operation unit 304 in correspondence with the fields 622 to 625 shown in FIG. 6C (S1610).

The CPU 201 settles the data added or changed in the aforementioned processing, controls the display information generation unit 312 to generate the check-out completion window 1001 which indicates the processing result, and transmits the generated window to the client (S1611), thus ending the processing.

[Check-In Processing]

Figure 17:
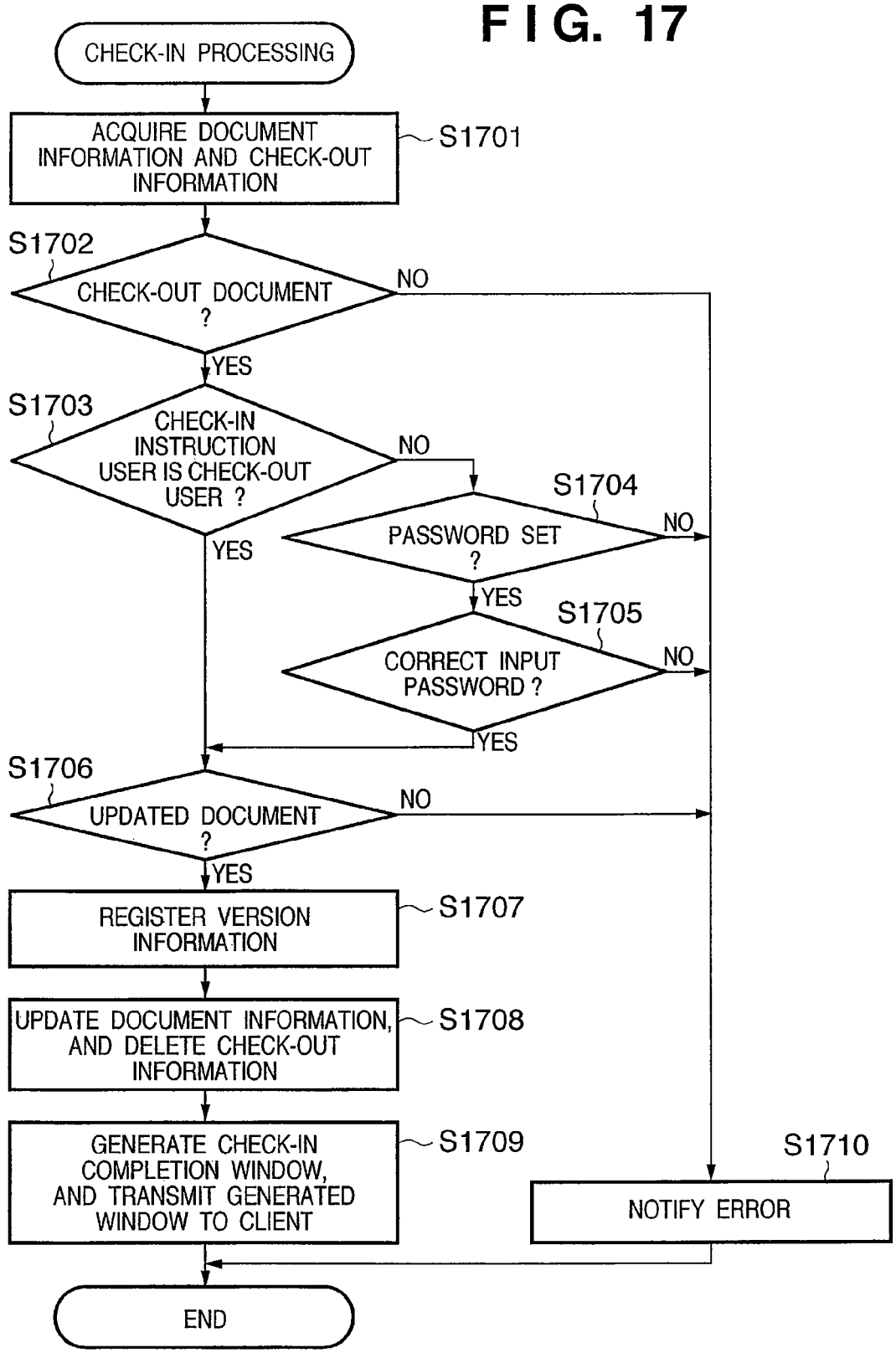
FIG. 17 is a flowchart for explaining check-in processing.

FIG. 17 is a flowchart for explaining the check-in processing. Upon pressing of the "check-in" button 1112 on the check-in window 1101 shown in FIG. 11, the CPU 201 of the document management apparatus 101 executes this processing.

The CPU 201 acquires document information (601 shown in FIG. 6A) and check-out information (621 shown in FIG. 6C) which match the document ID 1103 received from the client (S1701). The CPU 201 acquires these pieces of information from the document storage unit 301 and check-out information memory 303 via the document operation unit 302 and check-out information operation unit 304. The CPU 201 then checks the status (604 shown in FIG. 6A) of the acquired document information to check if the document of interest has been checked out (S1702). If the document of interest has been checked out, the process advances to step S1703; otherwise, the CPU 201 notifies the client of an error (S1710).

If the document corresponding to the document ID 1103 has been checked out, the CPU 201 compares the check-out user ID (624 shown in FIG. 6C) of the check-out information with the user ID of the use who instructed the check-in processing (S1703). If the two user IDs match, the process advances to step S1706.

If the two user IDs do not match, i.e., if a user different from the user who checked out the document instructed the check-in processing, the CPU 201 checks if a check-in password (625 shown in FIG. 6C) is set (S1704). If a check-in password is set, the process advances to step S1705; otherwise, the CPU 201 notifies the client of an error (S1710).

If a check-in password is set, the CPU 201 acquires a character string input to the password field 1111 on the check-in window 1101 shown in FIG. 11, and checks if the acquired password matches the check-in password in the check-out information (S1705). If the two passwords match, the process advances to step S1706; otherwise, the CPU 201 notifies the client of an error (S1710).

The CPU 201 checks if a document file (to be referred to as an "updated document" hereinafter) designated in the file name field 1109 on the check-in window 1101 shown in FIG. 11 is available (S1706). If the updated document is available, the process advances to step S1707; otherwise, the CPU 201 notifies the client of an error (S1710) since there is no document to be checked in.

If the updated document is available, the CPU 201 registers version information (611 shown in FIG. 6B) in the document storage unit 301 via the document operation unit 302 (S1707). The CPU 201 sets respective fields of the version information as follows. That is, the CPU 201 sets the document ID displayed in the document ID display field 1103 in the document ID field 612. The CPU 201 acquires a maximum value from a plurality of pieces of version information of the document with the same document ID stored in the document storage unit 301, and sets a value obtained by incrementing the maximum value in the version ID field 613. The CPU 201 sets the system date and time at that time in the registration date and time field 614. The CPU 201 sets the user ID of the user who checked out the document, and that of the user who instructed the check-in processing in the registered user ID field 615 as history information. The CPU 201 sets an entity (or file pointer) of the updated document in the file entity field 616.

The CPU 201 updates the document information of the document of interest by storing the document information whose status has been changed from "check-out" to "normal" in the document storage unit 301 via the document operation unit 302. The CPU 201 then deletes the check-out information of the document of interest from the check-out information table (621 shown in FIG. 6C) (S1708).

The CPU 201 settles the data added or changed in the aforementioned processing, controls the display information generation unit 312 to generate the check-in completion window 1201, and transmits the generated window to the client (S1709), thus ending the processing.

[Cancel Password]

Figure 18:
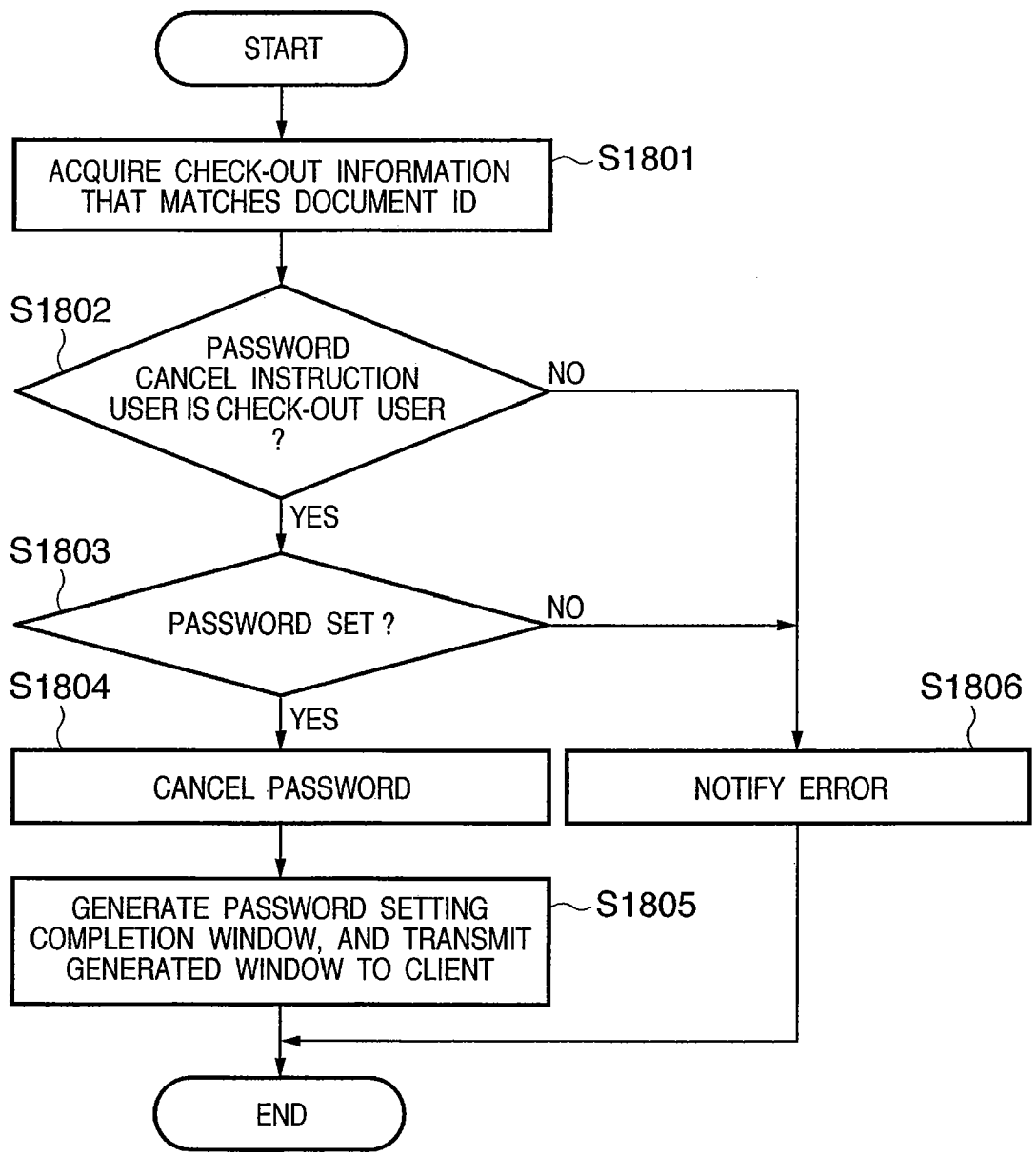
FIG. 18 is a flowchart for explaining processing for canceling a password.

FIG. 18 is a flowchart for explaining the processing for canceling a password. Upon pressing of the "cancel" button 1310 on the password change window 1301 shown in FIG. 13, the CPU 201 of the document management apparatus 101 executes this processing.

The CPU 201 acquires check-out information (621 shown in FIG. 6C) that matches the document ID 1303 received from the client from the check-out information memory 303 via the check-out information operation unit 304 (S1801). The CPU 201 then checks if the check-out user ID (624 shown in FIG. 6C) of the acquired check-out information matches the user ID of the user who instructed to cancel the check-in password (S1802). If the two user IDs match, the process advances to step S1803; otherwise, the CPU 201 notifies the client of an error (S1806).

If the two user IDs match, the CPU 201 checks if the check-in password is set in the password field (625 shown in FIG. 6C) of the acquired check-out information (S1803). If the check-in password is set, the process advances to step S1804; otherwise, the CPU 201 notifies the client of an error (S1806).

If the check-in password is set, the CPU 201 stores via the check-out information operation unit 304 check-out information whose password field 625 is cleared in the check-out information memory 303. With this processing, the CPU 201 cancels the check-in password (S1804). The CPU 201 settles the data added or changed in the aforementioned processing, controls the display information generation unit 312 to generate the check-in password setting completion window 1401 which indicates the processing result, and transmits the generated window to the client (S1805), thus ending the processing.

[Re-Generate Password]

Figure 19:
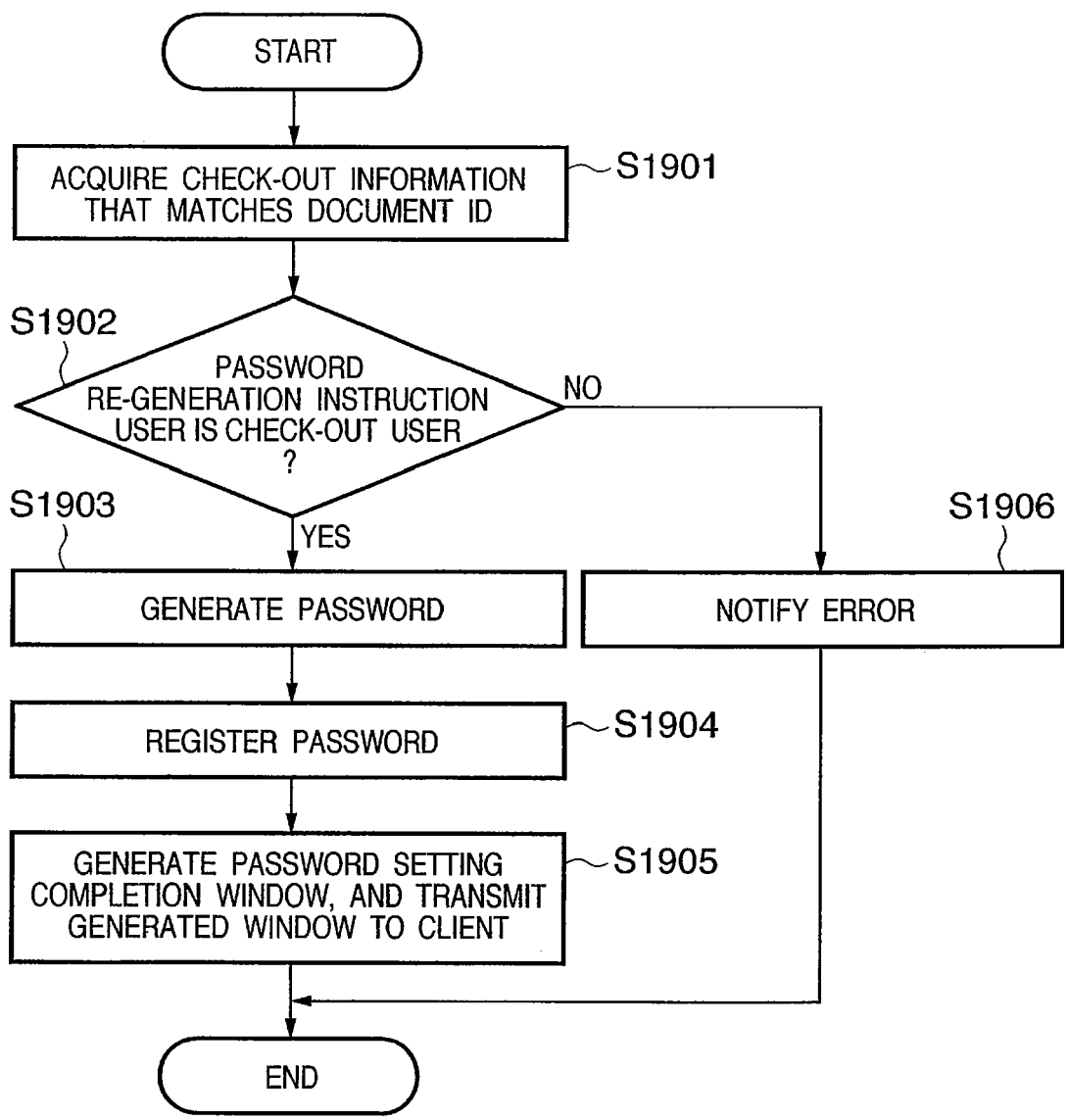
FIG. 19 is a flowchart for explaining processing for re-generating a password.

FIG. 19 is a flowchart for explaining the processing for re-generating a password. Upon pressing of the "re-generate" button 1309 on the password change window 1301 shown in FIG. 13, the CPU 201 of the document management apparatus 101 executes this processing.

The CPU 201 acquires check-out information (621 shown in FIG. 6C) that matches the document ID 1303 received from the client from the check-out information memory 303 via the check-out information operation unit 304 (S1901). The CPU 201 then checks if the check-out user ID (624 shown in FIG. 6C) of the acquired check-out information matches the user ID of the user who instructed to cancel the check-in password (S1902). If the two user IDs match, the process advances to step S1903; otherwise, the CPU 201 notifies the client of an error (S1906).

If the two user IDs match, the CPU 201 controls the password generation unit 311 to generate a password (S1903). The password to be generated is a character string which can be input by the user who accesses the document management apparatus 101. The CPU 201 stores check-out information in the password field (625 shown in FIG. 6C) of which a new check-in password is written in the check-out information memory 303 via the check-out information operation unit 304. In this way, the CPU 201 changes the check-in password (S1904). The CPU 201 settles the data added or changed in the aforementioned processing, controls the display information generation unit 312 to generate the check-in password setting completion window 1401 which indicates the processing result, and transmits the generated window to the client (S1905), thus ending the processing.

As described above, by using the check-in password, a user other than the user who checked out the document can execute the check-in processing for the check-out user. Therefore, even when the user who checked out the document cannot check in that document for some reason, another user can execute the check-in processing for the check-out user, thus preventing any delay of the document update operation.

Second Embodiment

Document processing according to the second embodiment of the present invention will be described hereinafter. Note that the same reference numerals in the second embodiment denote the same parts as in the first embodiment, and a detailed description thereof will be omitted.

[Functional Arrangement of Document Management Apparatus]

Figure 20:
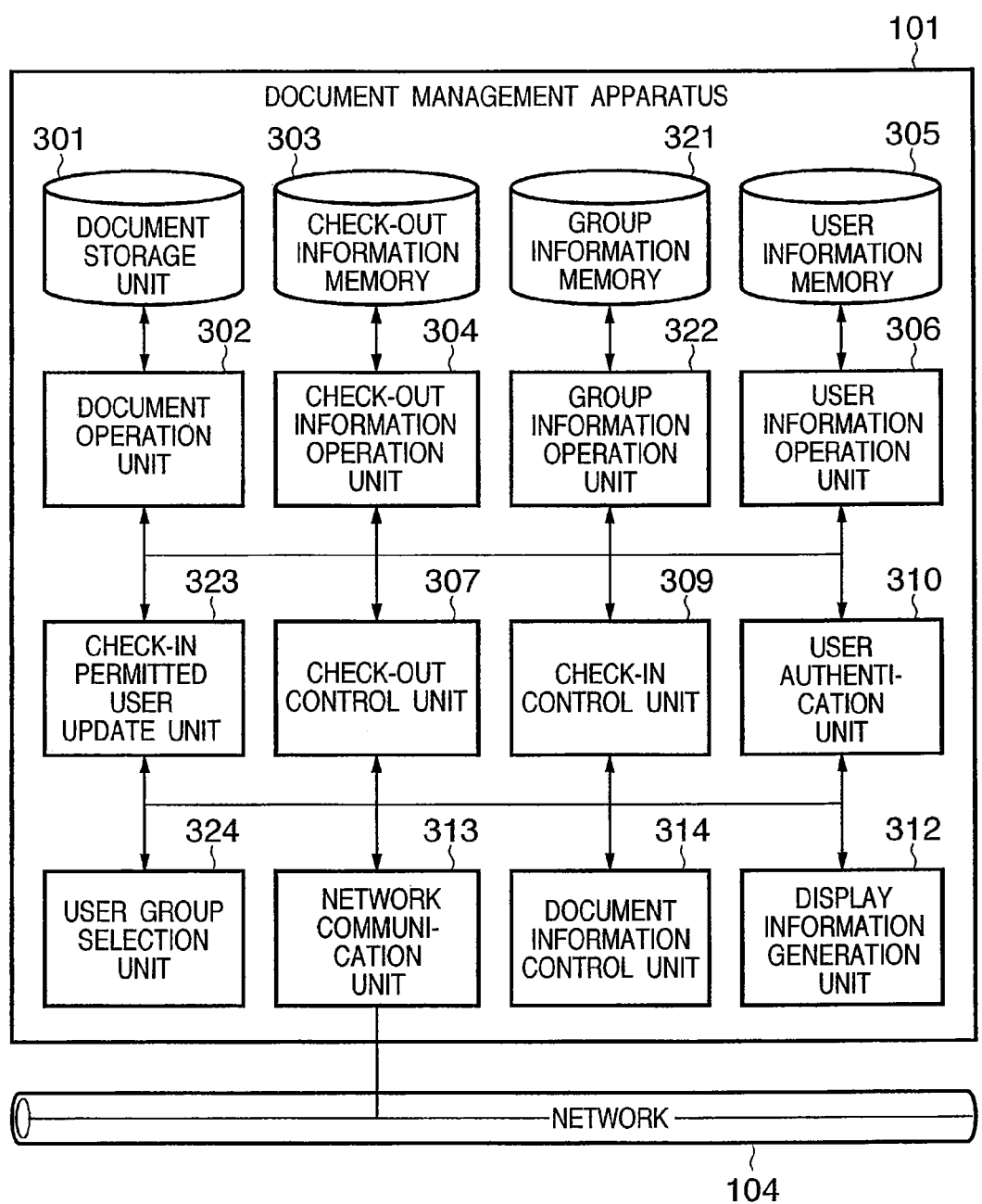
FIG. 20 is a block diagram showing the arrangement of a document management apparatus according to the second embodiment.

FIG. 20 is a block diagram showing an example of the arrangement of the document management apparatus 101 of the second embodiment.

The arrangement shown in FIG. 20 is substantially the same as that shown in FIG. 3, except that the password generation unit 311 is omitted, and a group information memory 321, group information operation unit 322, check-in permitted user update unit 323, and user group selection unit 324 are added. Note that the group information memory 321 is assured on the RAM 202 or HDD 213. The group information operation unit 322, check-in permitted user update unit 323, and user group selection unit 324 are implemented by programs which are loaded onto the RAM 202 and are executed by the CPU 201.

The group information memory 321 stores group information which combines a plurality of pieces of user information stored in the user information memory 305 in arbitrary units. The group information operation unit 322 executes input/output processing such as registration, updating, deleting, acquisition, and the like of group information with respect to the group information memory 321.

The check-in permitted user update unit 323 controls to update user or group information, which is to be set in check-out information and is permitted to execute the check-in operation, using the check-out information operation unit 304, user information operation unit 306, and group information operation unit 322.

The user group selection unit 324 controls processing for selecting a check-in permitted user or group.

[Data Format]

The document information, version information, and user information have the same formats as those shown in FIGS. 6A, 6B, and 6D of the first embodiment, and a description thereof will be omitted.

FIG. 21A shows the format of a check-out information table 2101 stored in the check-out information memory 303 of the second embodiment. Unlike in the check-out information table 621 shown in FIG. 6C, the check-out information table 2101 does not have any password field. The check-out information table 2101 includes fields of a document ID 2102, check-out date and time 2103, and check-out user ID 2104.

FIG. 21B shows the format of a check-in permitted user/group table 2111 which is stored in the check-out information memory 303 together with the check-out information table 2101. The check-in permitted user/group table 2111 includes fields of a document ID 2112, setting unit 2113, and permitted user/group ID 2114.

The document ID 2112 is associated with the document ID 2102. The setting unit 2113 indicates whether a target who is to be permitted to execute the check-in operation of a document corresponding to the document ID 2112 is a user or group. The permitted user/group ID 2114 holds the user ID registered in the user information table (631 shown in FIG. 6D) or a group ID registered in a group information table (to be described below). Note that the permitted user/group ID 2114 holds the user or group ID intact, and the CPU 201 cannot determine the user or group based only on that ID. Hence, the setting unit 2113 indicates the user or group.

Figure 21C:
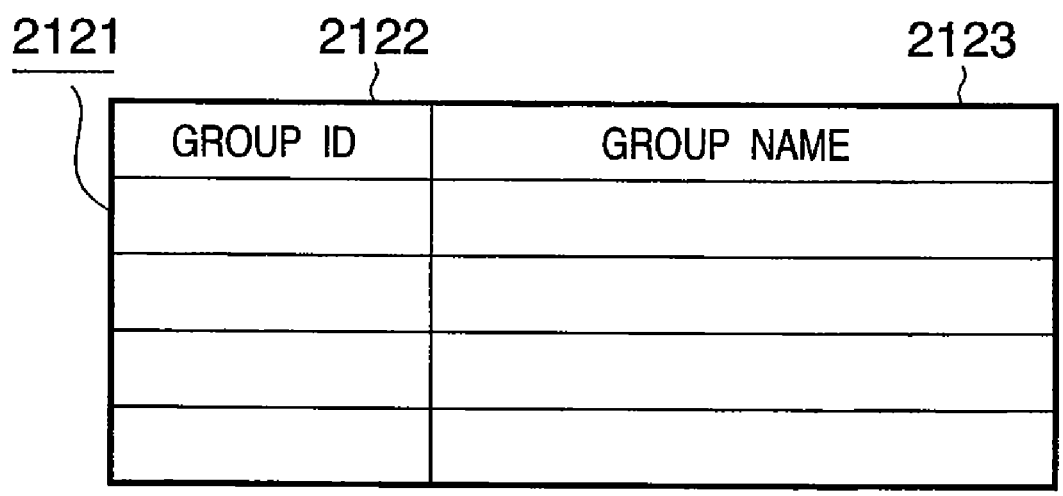
FIG. 21C shows the format of a group information table stored in a group information memory.

FIG. 21C shows the format of a group information table 2121 stored in the group information memory 321. The group information table 2121 includes fields of a group ID 2122 and group name 2123. Note that the group ID 2122 is an ID that uniquely identifies the group.

Figure 21D:
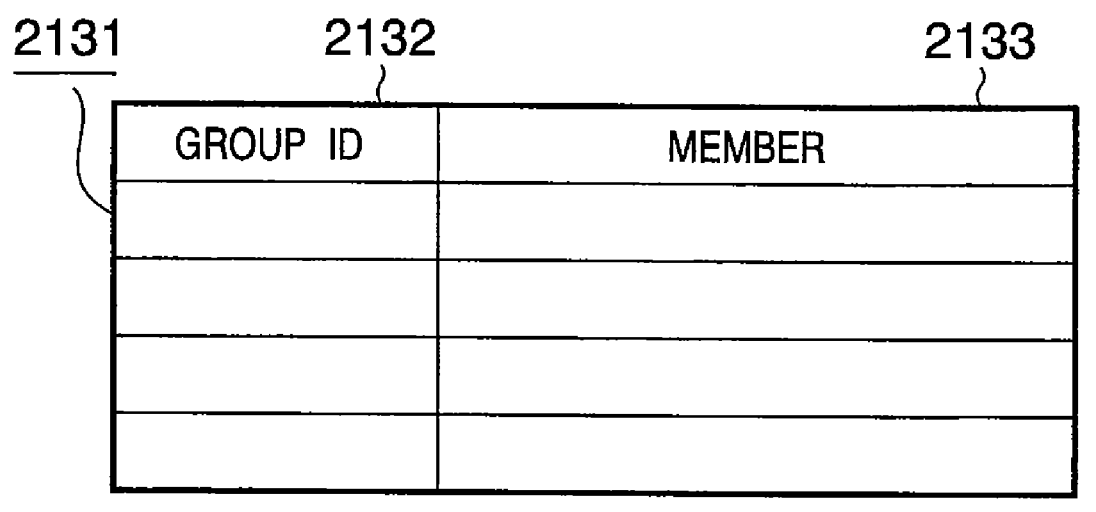

FIG. 21D shows the format of a group member table 2131 stored in the group information memory 321 together with the group information table 2121. The group member table 2131 includes fields of a group ID 2131 and member 2133.

The group ID 2132 is associated with the group ID 2122. The member 2133 registers a plurality of user IDs.

[User Interface Window]

User interface windows displayed on the clients 102 and 103 in the second embodiment will be described below. Note that display windows to be described below have minimum required configurations, and can display information other than those to be described below and illustrated in the drawings. Also, information is transmitted to the document management apparatus 101 in response to an operation instruction on each user interface window. In this case, the transmission information is appended with identification information of the client (for example, the address information of the client) and user identification information (user ID).

Document Browse Window

Figure 22:
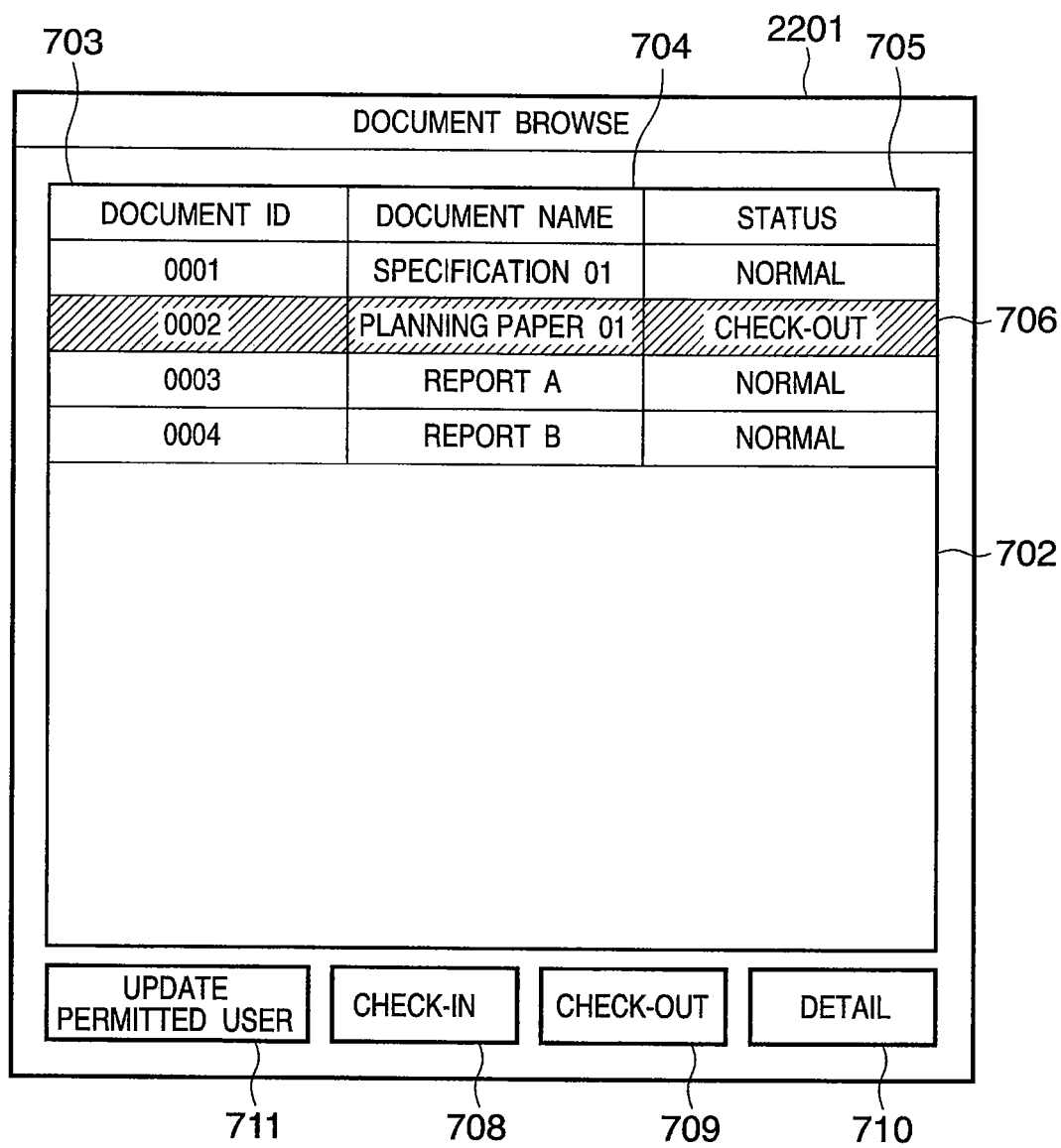
FIG. 22 shows a document browse window.

FIG. 22 shows a document browse window 2201, which is used upon browsing document information managed by the document management apparatus 101.

The window shown in FIG. 22 is substantially the same as that shown in FIG. 7, except that an "update permitted user" button 711 is added in place of the "change password" button 707.

The "update permitted user" button 711 launches change processing of settings of users/groups who are permitted to check in a document which is selected on the document information display area 702 and corresponds to check-out document information 706. When the user presses the button 711, information indicating the document information selected at that time is passed to the check-in permitted user update unit 323 of the document management apparatus 101.

Check-Out Window

Figure 23:
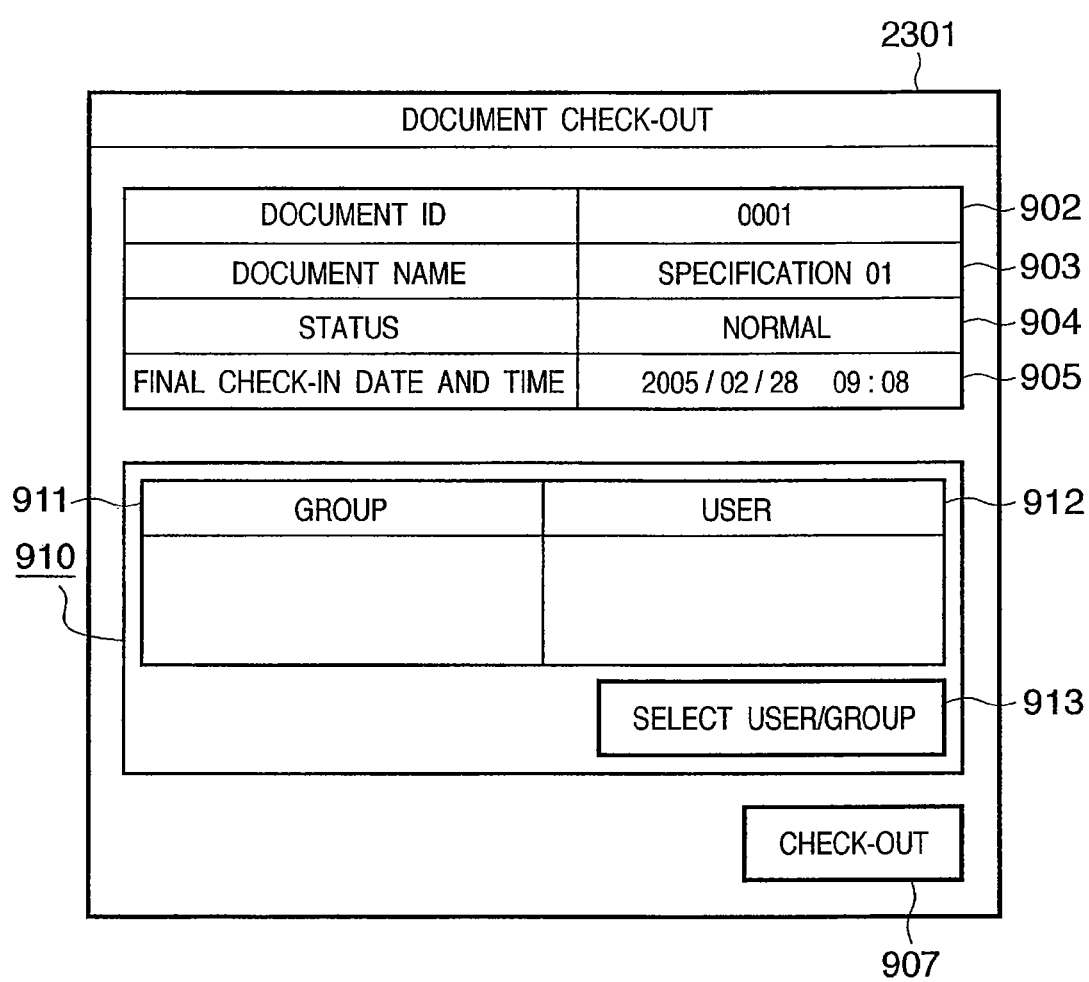
FIG. 23 shows a check-out window.

FIG. 23 shows a check-out window 2301 of the second embodiment, which is displayed upon pressing of the "check-out" button 709 on the document browse window 2201.

The window shown in FIG. 23 is substantially the same as that shown in FIG. 9, except that a check-in permitted user/group display area 910 is assured in place of the check box 906 used to generate a check-in password.

The check-in permitted user/group display area 910 includes a permitted group list 911, permitted user list 912, and "select user/group" button 913. The permitted group list 911 displays a list of names of groups for whom the user permits a check-in operation. The permitted user list 912 displays a list of names of users for whom the user permits a check-in operation.

When the user presses the "select user/group" button 913, the process shifts to the user group selection unit 324 of the document management apparatus 101 to display a window used to update display of the permitted group list 911 and permitted user list 912.

Note that the aforementioned "user" is a user who is operating the check-out window to check out a document, needless to say.

Check-Out Completion Window

Figure 24:
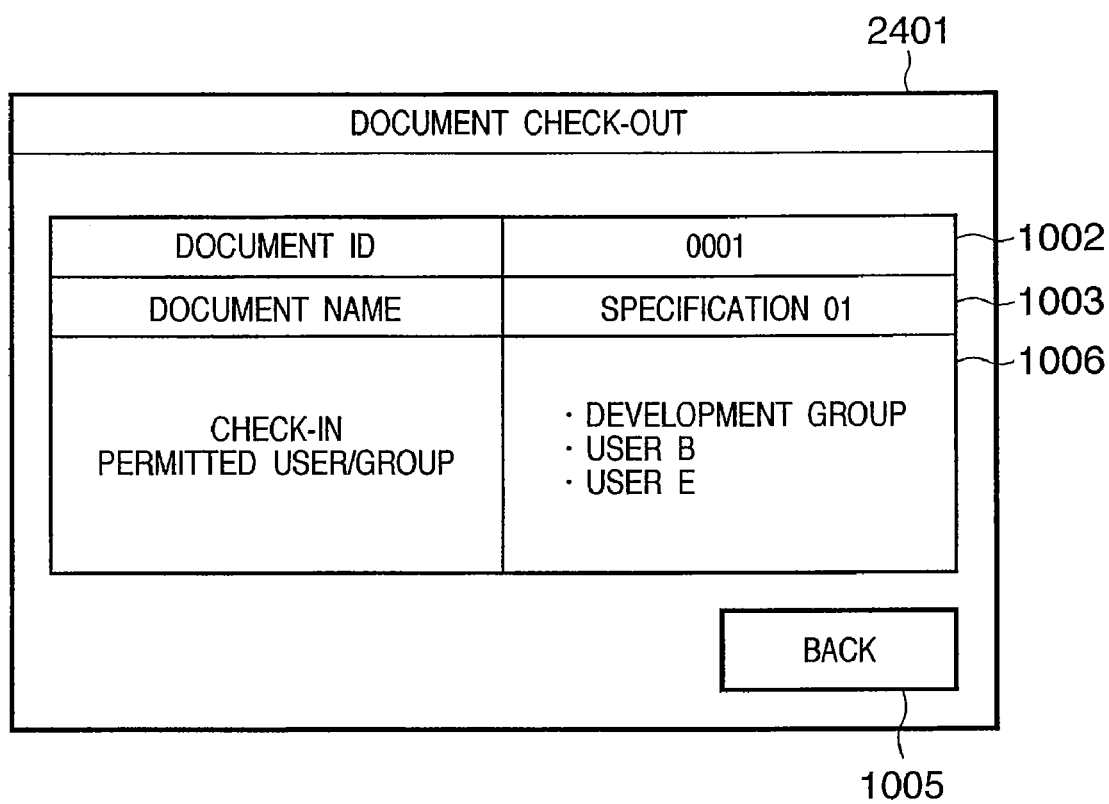
FIG. 24 shows a check-out completion window.

FIG. 24 shows a check-out completion window 2401 of the second embodiment, which displays the result of the check-out processing launched upon pressing of the "check-out" button 907 on the check-out window 2301.

The window shown in FIG. 24 is substantially the same as that shown in FIG. 10, except that a check-in permitted user/group display field 1006 is assured in place of the display field 1004 that displays a check-in password. When neither the user nor the group are selected on the check-in permitted user/group display area 910, the check-in permitted user/group display field 1006 itself is not displayed.

Check-In Window

Figure 25:
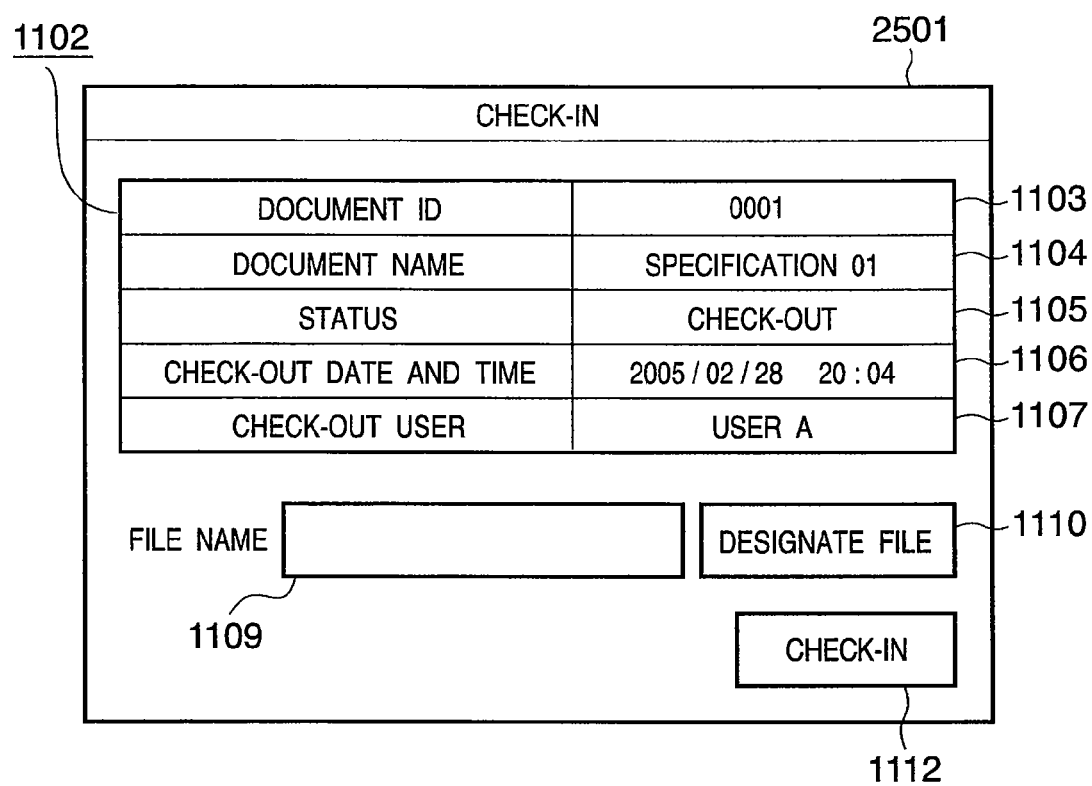
FIG. 25 shows a check-in window.

FIG. 25 shows a check-in window 2501 of the second embodiment, which is displayed upon pressing of the "check-in" button 708 on the document browse window 2201.

The window shown in FIG. 25 is substantially the same as that shown in FIG. 11, except that the check-in password display field 1108 and password input field 1111 are omitted.

Check-In Completion Window

A check-in completion window is the same as the check-in completion window 1201 shown in FIG. 12, and a description thereof will be omitted.

User/Group Selection Window

Figure 26:
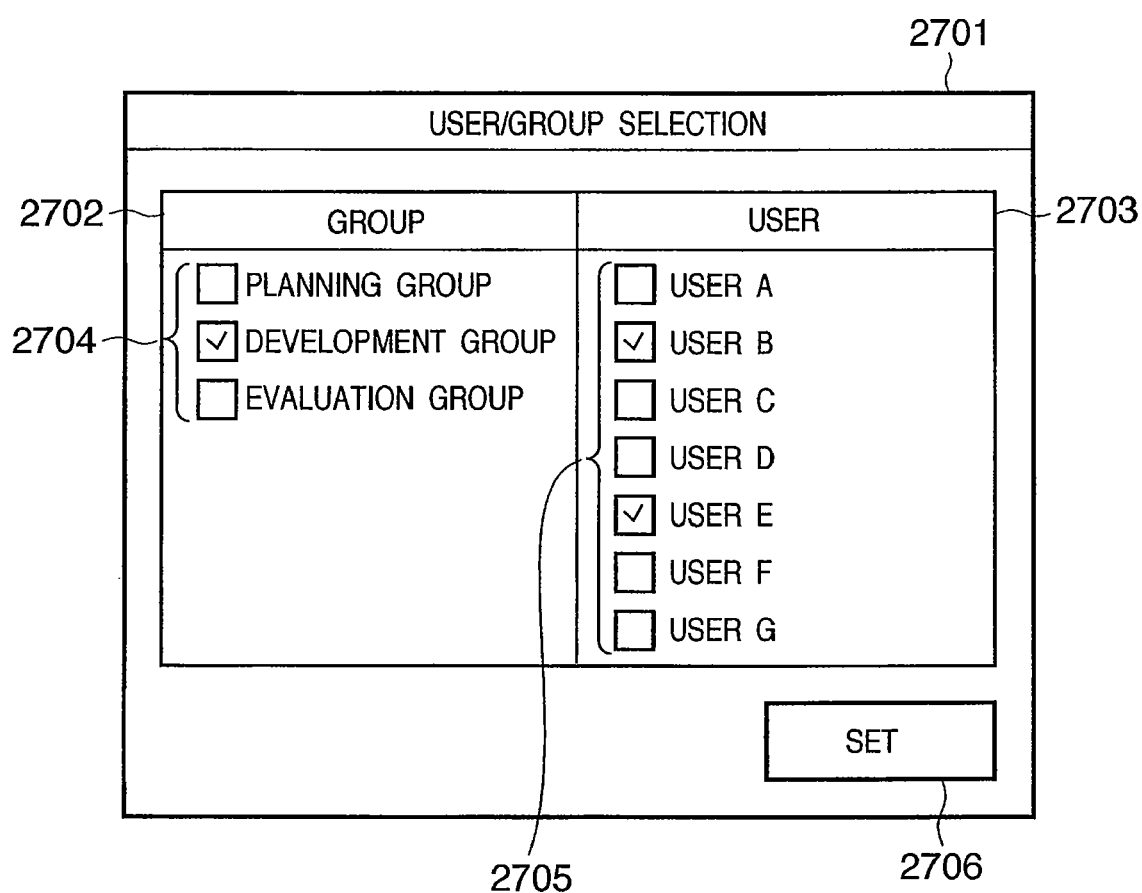
FIG. 26 shows a user/group selection window.

FIG. 26 shows a user/group selection window 2701, which is displayed upon pressing of the "update permitted user" button 711 on the document browse window 2201 or upon pressing of the "select user/group" button 913 on the check-out window 2301.

The user/group selection window 2701 has a group information display field 2702, user information display field 2703, and "set" button 2706. The group information display field 2702 displays group names registered in the group information memory 321 of the document management apparatus 101, and check boxes 2704. The user information display field 2703 displays user names registered in the user information memory 305 of the document management apparatus 101, and check boxes 2705. When the user checks the corresponding check boxes, he or she can select one or a plurality of groups and/or users for whom he or she permits a check-in operation.

When the user presses the "set" button 2706 after he or she checks (or unchecks) the check boxes, information indicating the users/groups selected by the user is passed to the user group selection unit 324 of the document management apparatus 101.

User/Group Setting Completion Window

FIG. 27 shows a user/group setting completion window 2801, which displays the result of the user/group setting processing launched upon pressing of the "set" button 2706 on the user/group selection window 2701.

The user/group setting completion window 2801 has display fields of a document ID 2802, document name 2803, and check-in permitted user/group list 2804, and a "back" button 2805. The user/group setting completion window 2801 allows users/groups displayed on the check-in permitted user/group list 2804 to recognize that they are permitted to check in the document corresponding to the document ID 2802.

The "back" button 2805 is pressed to close the user/group setting completion widow 2801, and to return to the document browse window 2201.

[Check-Out Processing]

Figure 28:
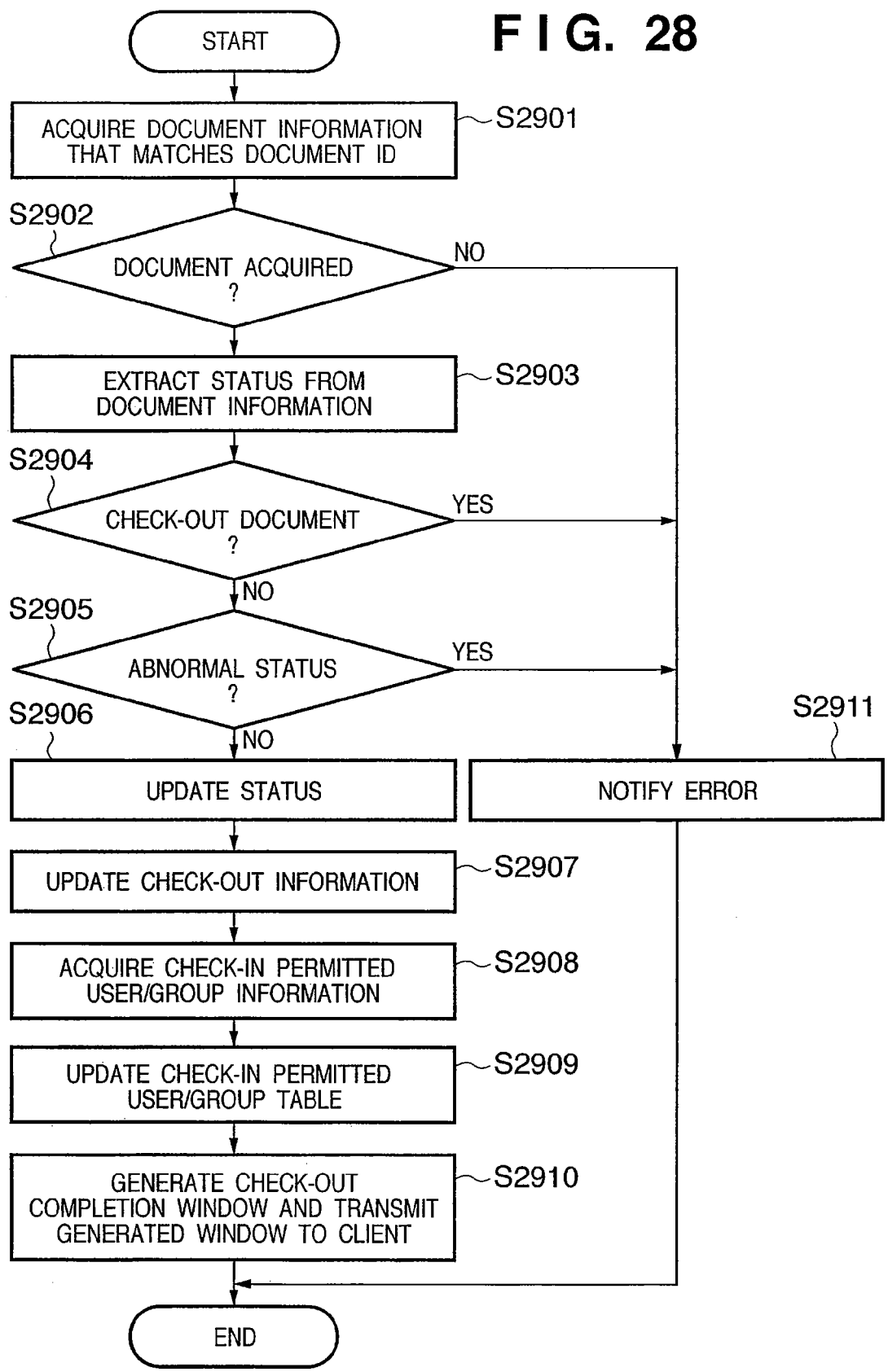
FIG. 28 is a flowchart for explaining check-out processing.

FIG. 28 is a flowchart for explaining the check-out processing. Upon pressing of the "check-out" button 907 on the check-out window 2301 shown in FIG. 23, the CPU 201 of the document management apparatus 101 executes this processing.

The CPU 201 acquires document information (601 shown in FIG. 6A) that matches the document ID 902 received from the client from the document storage unit 301 via the document operation unit 302 (S2901). The CPU 201 checks if a document corresponding to the document ID 902 can be acquired (S2902). If the document of interest can be acquired, the process advances to step S2903; otherwise, the CPU 201 notifies the client of an error (S2911).

If the document corresponding to the document ID 902 can be acquired, the CPU 201 extracts the status (604 shown in FIG. 6A) from the acquired document information (S2903) to check if the document of interest has been checked out (S2904). If the document of interest has not been checked out yet, the process advances to step S2905; otherwise, the CPU 201 notifies the client of an error (S2911).

If the document corresponding to the document ID 902 has not been checked out yet, the CPU 201 checks If the extracted status is normal (S2905). If the status assumes a normal value, the process advances to step S2906; otherwise, the CPU 201 notifies the client of an error (S2911).

If the status of the document corresponding to the document ID 902 assumes a normal value, the CPU 201 stores document information whose status value is changed to "check-out" in the document storage unit 301 via the document operation unit 302. In this manner, the CPU 201 updates the status of that document (S2906).

Next, the CPU 201 acquires a check-out date and time (2103 shown in FIG. 21A) to be registered in the check-out information (2101 shown in FIG. 21A) from a system date and time of the document management apparatus 101. The CPU 201 registers the document ID, date and time, and user ID in the check-out information memory 303 via the check-out information operation unit 304 in correspondence with the fields 2102 to 2104 shown in FIG. 21A (S2907).

The CPU 201 then acquires the check-in permitted user/group information received from the client (S2908). The CPU 201 updates the check-in permitted user/group table (2111 shown in FIG. 21B) based on the acquired check-in permitted user/group information (S2909). That is, the CPU 201 registers the check-in permitted users and groups each as one record in the check-out information table in association with the document ID. The CPU 201 then stores the check-in permitted user/group table in the check-out information memory 303 via the check-out information operation unit 304, thus setting the check-in permitted users/groups.

The CPU 201 settles the data added or changed in the aforementioned processing, controls the display information generation unit 312 to generate the check-out completion window 2401 which indicates the processing result, and transmits the generated window to the client (S2910), thus ending the processing.

[Check-In Processing]

Figure 29:
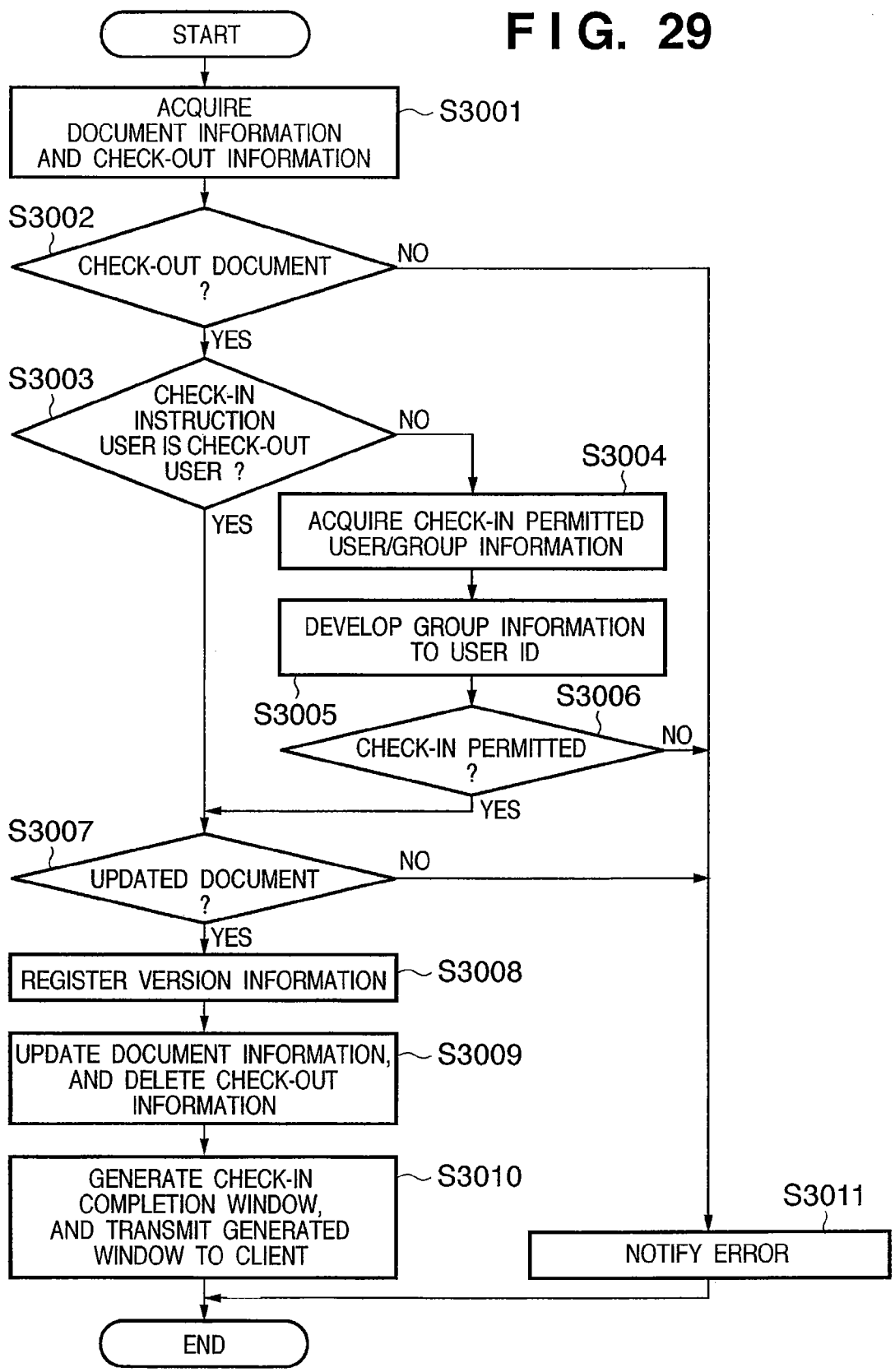
FIG. 29 is a flowchart for explaining check-in processing.

FIG. 29 is a flowchart for explaining the check-in processing. Upon pressing of the "check-in" button 1112 on the check-in window 2501 shown in FIG. 25, the CPU 201 of the document management apparatus 101 executes this processing.

The CPU 201 acquires document information (601 shown in FIG. 6A) and check-out information (2101 shown in FIG. 21A) which match the document ID 1103 received from the client (S3001). The CPU 201 acquires these pieces of information from the document storage unit 301 and check-out information memory 303 via the document operation unit 302 and check-out information operation unit 304. The CPU 201 then checks the status (604 shown in FIG. 6A) of the acquired document information to check if the document of interest has been checked out (S3002). If the document of interest has been checked out, the process advances to step S3003; otherwise, the CPU 201 notifies the client of an error (S3011).

If the document corresponding to the document ID 1103 has been checked out, the CPU 201 compares the check-out user ID (2104 shown in FIG. 21A) of the check-out information with the user ID of the use who instructed the check-in processing (S3003). If the two user IDs match, the process advances to step S3007.

If the two user IDs do not match, i.e., if a user different from the user who checked out the document instructed the check-in processing, the CPU 201 acquires the check-in permitted user/group information (S3004). That is, the CPU 201 acquires user/group information corresponding to the document ID from the user/group table (2111 shown in FIG. 21B). The CPU 201 then develops each group ID to user IDs with reference to the group member table (2131 shown in FIG. 21D) stored in the group information memory 321 in association with the permitted group information. The CPU 201 merges the developed user IDs with the acquired permitted user information (user IDs) (S3005). The CPU 201 checks if the user ID of the user who instructed the check-in processing is included in the check-in permitted user IDs (S3006). If the user ID of the user who instructed the check-in processing is included in the check-in permitted user IDs, the process advances to step S3007; otherwise, the CPU 201 notifies the client of an error (S3011).

The CPU 201 checks if a document file (to be referred to as an "updated document" hereinafter) designated in the file name field 1109 on the check-in window 2501 shown in FIG. 25 is available (S3007). If the updated document is available, the process advances to step S3008; otherwise, the CPU 201 notifies the client of an error (S3011) since there is no document to be checked in.

If the updated document is available, the CPU 201 registers version information (611 shown in FIG. 6B) in the document storage unit 301 via the document operation unit 302 (S3008). The CPU 201 sets respective fields of the version information as follows. That is, the CPU 201 sets the document ID displayed in the document ID display field 1103 (FIG. 25) in the document ID field 612. The CPU 201 acquires a maximum value from a plurality of pieces of version information of the document with the same document ID stored in the document storage unit 301, and sets a value obtained by incrementing the maximum value in the version ID field 613. The CPU 201 sets the system date and time at that time in the registration date and time field 614. The CPU 201 sets the user ID of the user who checked out the document, and that of the user who instructed the check-in processing in the registered user ID field 615. The CPU 201 sets an entity (or file pointer) of the updated document in the file entity field 616.

The CPU 201 updates via the document operation unit 302 the document information of the document of interest by storing the document information whose status has been changed from "check-out" to "normal" in the document storage unit 301. The CPU 201 then deletes the check-out information of the document of interest from the check-out information table (2101 shown in FIG. 21A) (S3009).

The CPU 201 settles the data added or changed in the aforementioned processing, controls the display information generation unit 312 to generate the check-in completion window 1201, and transmits the generated window to the client (S3010), thus ending the processing.

[Check-In Permitted User/Group Update Processing]

Figure 30:
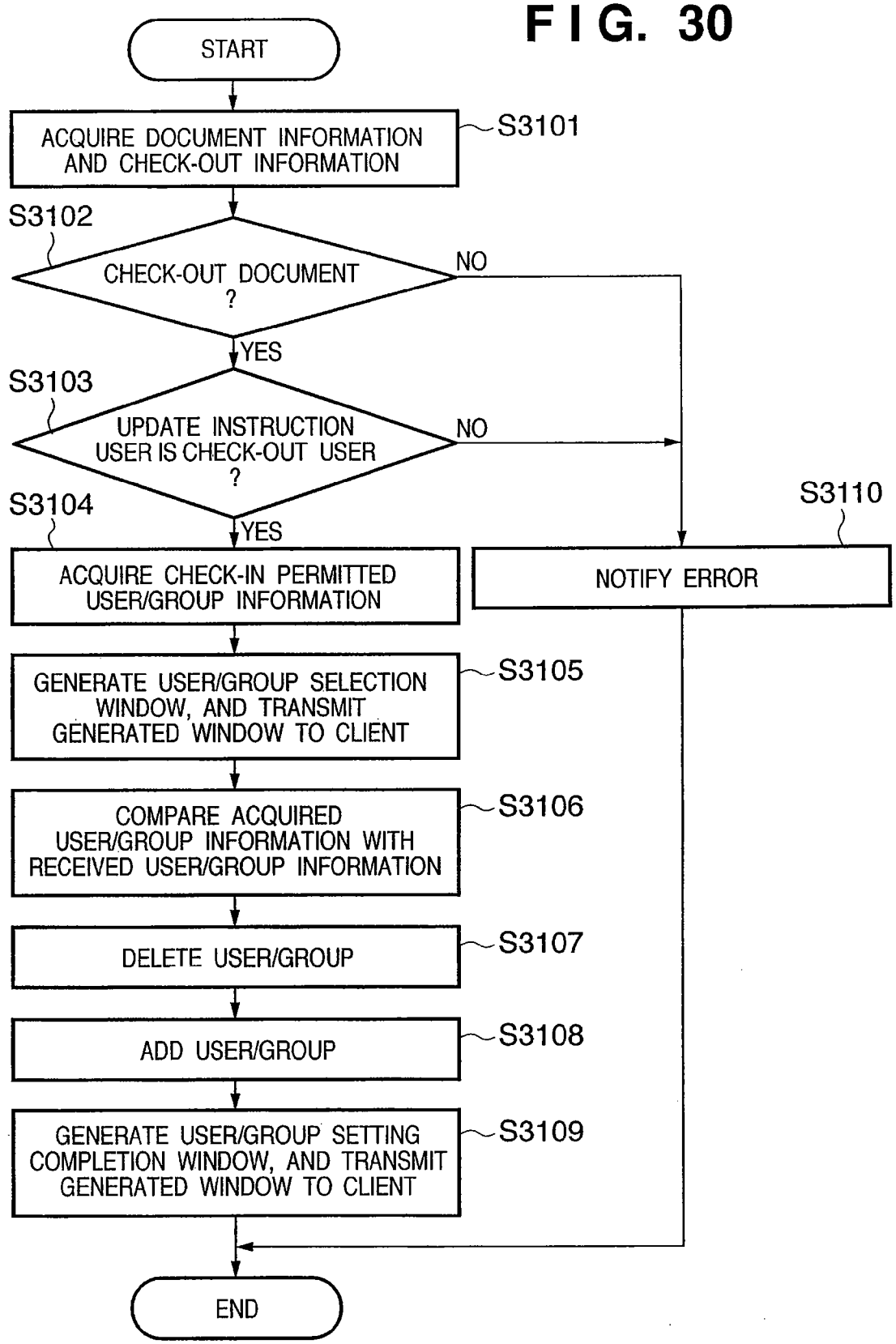
FIG. 30 is a flowchart for explaining update processing of a check-in permitted user/group.

FIG. 30 is a flowchart for explaining the check-in permitted user/group update processing. Upon pressing of the "update permitted user" button 711 on the document browse window 2201 shown in FIG. 22, the CPU 201 of the document management apparatus 101 executes this processing.

The CPU 201 acquires document information (601 shown in FIG. 6A) and check-out information (2101 shown in FIG. 21A) which match the document ID 706 received from the client (S3101). The CPU 201 acquires these pieces of information from the document storage unit 301 and check-out information memory 303 via the document operation unit 302 and check-out information operation unit 304. The CPU 201 then checks the status (604 shown in FIG. 6A) of the acquired document information to check if the document of interest has been checked out (S3102). If the document of interest has been checked out, the process advances to step S3103; otherwise, the CPU 201 notifies the client of an error (S3110).

If the document of interest has been checked out, the CPU 201 compares the check-out user ID (2104 shown in FIG. 21A) of the acquired check-out information with the user ID of the use who instructed the update processing (S3103). If the two user IDs match, the process advances to step S3104; otherwise, the CPU 201 notifies the client of an error (S3110).

If the two user IDs match, the CPU 201 acquires user/group information corresponding to the document ID from the user/group table (2111 shown in FIG. 21B). Furthermore, the CPU 201 acquires information of the registered users and groups from the user information memory 305 and group information memory 321 (S3104). Then, the CPU 201 controls the display information generation unit 312 to generate the user/group selection window 2701 shown in FIG. 26 based on the acquired information of the registered users and groups and the check-in permitted user/group information, and transmits the generated window to the client (S3105).

The user operates the user/group selection window 2701 to sort out the check-in permitted users/groups, and then presses the "set" button 2706.

Upon reception of the selected user/group information from the client, the CPU 201 compares the check-in permitted user/group information acquired in step S3104 with the received selected user/group information (S3106). The CPU 201 deletes the user and group IDs which are included in the acquired user/group information and are not included in the received selected user/group information from the user/group table (2111 shown in FIG. 21B) corresponding to the document ID (S3107). Furthermore, the CPU 201 adds the user and group IDs which are included in the received selected user/group information and are not included in the acquired user/group information to the user/group table (2111 shown in FIG. 21B) corresponding to the document ID (S3108).

Finally, the CPU 201 settles the data added or changed in the aforementioned processing, controls the display information generation unit 312 to generate the user/group setting completion window 2801 indicating the processing result, and transmits the generated window to the client (S3109), thus ending the processing.

As described above, since the users/groups who can perform a check-in operation are set, a user other than the user who checked out a document can execute the check-in processing for that check-out user. Therefore, even when the user who checked out the document cannot check in that document for some reason, another user can execute the check-in processing for the check-out user, thus preventing any delay of the document update operation.

Other Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-026175, filed Feb. 2, 2006, which is hereby incorporated by reference herein in its entirety.

What is claimed is:

1. A method of managing document data stored in a memory, the method comprising the steps of:
setting, based on a check-out instruction of a first user, update processing of document data stored in the memory in an exclusive state with respect to a second user other than the first user;
generating a check-in password required to cancel the exclusive state and storing the generated check-in password in the memory, where the check-in password is not related to first or second user login;
informing the first user of the check-in password generated in the generating step; and
canceling the exclusive state in case a check-in instruction without the check-in password is entered by the first user and also in case a check-in instruction with the check-in password is entered by the second user who has received the check-in password from the first user, wherein the exclusive state is not canceled when a check-in instruction without the check-in password is entered by the second user.

2. The method according to claim 1, further comprising the step of deleting or updating the check-in password when a deleting or updating instruction is instructed by the first user.

3. The method according to claim 1, further comprising the step of storing information of the first user who instructed the check-out instruction and the second user who entered the check-in instruction with the check-in password in the memory as history information.

4. A document management apparatus for managing document data stored in a memory, comprising:
a check-out section, arranged to set, based on a check-out instruction of a first user, update processing of document data stored in the memory in an exclusive state with respect to a second user other than the first user;
a generator, arranged to generate a check-in password required to cancel the exclusive state and to store the generated check-in password in the memory, and to inform the first user of the generated check-in password, where the check-in password is not related to first or second user login; and
a check-in section, arranged to cancel the exclusive state in case a check-in instruction without the check-in password is entered by the first user and also in case a check-in instruction with the check-in password is entered by the second user who has received the check-in password from the first user, wherein the exclusive state is not canceled when a check-in instruction without the check-in password is entered by the second user.

5. A computer-readable storage medium storing a computer-executable program for causing a computer to perform a method of managing document data stored in a memory, the method comprising the steps of:
setting, based on a check-out instruction of a first user, update processing of document data stored in the memory in an exclusive state with respect to a second user other than the first user;
generating a check-in password required to cancel the exclusive state and storing the generated check-in password in the memory, where the check-in password is not related to first or second user login;
informing the first user of the check-in password generated in the generating step; and
canceling the exclusive state in case a check-in instruction without the check-in password is entered by the first user and also in case a check-in instruction with the check-in password is entered by the second user who has received the check-in password from the first user, wherein the exclusive state is not canceled when a check-in instruction without the check-in password is entered by the second user.

* * * * *